United States Patent [19]
Yanagihara

[11] Patent Number: 5,864,695
[45] Date of Patent: *Jan. 26, 1999

[54] IC CARD CONTROL CIRCUIT AND IC CARD CONTROL SYSTEM

[75] Inventor: Junichi Yanagihara, Tokyo, Japan

[73] Assignee: Oki Electric Industry Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 702,513

[22] PCT Filed: Dec. 25, 1995

[86] PCT No.: PCT/JP95/02657

§ 371 Date: Aug. 27, 1996

§ 102(e) Date: Aug. 27, 1996

[87] PCT Pub. No.: WO96/20457

PCT Pub. Date: Jul. 4, 1996

[30]     Foreign Application Priority Data

Dec. 28, 1994  [JP]  Japan .................................. 6-327786

[51] Int. Cl.⁶ ................................. G06F 1/04; G06F 1/24
[52] U.S. Cl. ......................... 395/555; 395/557; 395/559
[58] Field of Search ..................................... 395/551, 552, 395/555, 557, 559, 651, 652, 750.01, 750.07, 750.08

[56]                References Cited

U.S. PATENT DOCUMENTS

| 4,464,584 | 8/1984 | Hentzschel et al. | 307/200 A |
| 4,528,629 | 7/1985 | Breitling | 364/431.11 |
| 5,454,114 | 9/1995 | Yach et al. | 395/750.07 |
| 5,513,358 | 4/1996 | Lundberg et al. | 395/750 |

FOREIGN PATENT DOCUMENTS 63-244287  10/1988  Japan .............................. G06K 17/00

*Primary Examiner*—Dennis M. Butler
*Attorney, Agent, or Firm*—Rabin & Champagne P.C.

[57]                ABSTRACT

An integrated circuit card control circuit includes a clock control circuit for receiving a control signal, delaying the received control signal by a first delay time, and outputting the delayed control signal as a clock control signal. A delayed signal generating circuit receives the control signal, delays the control signal by a second delay time which is longer than the first delay time, and outputs the delayed control signal as a delayed signal. A power supply control circuit outputs a power supply control signal in response to one of either the control signal or the delayed signal, and a reset control circuit outputs a reset control signal in response to both the control signal and the delayed signal.

16 Claims, 36 Drawing Sheets ered to as "IC card") reader/writers exist as prior art IC
IC CARD CONTROL CIRCUIT AND IC CARD CONTROL SYSTEM

FIELD OF THE INVENTION

The present invention relates to an IC card control circuit for controlling an operating state of an IC card, and an IC card control system.

BACKGROUND INFORMATION

What are known as integrated circuit card (hereinafter referred to as "IC card") reader/writers exist as prior art IC card control circuits for reading out IC card information and writing information to the IC card. Such conventional IC card reader/writers are mainly incorporated into Automatic Teller Machine (ATM) and Point Of Sale (POS) terminals.

However, because such conventional IC card reader/writers are incorporated into ATM or POS terminals, utilizing IC cards has been limited to ATM and POS terminals. Also, because it is necessary to design the conventional IC card reader/writers and IC cards exclusively for the ATM and POS terminals, the initial investment is very large. The spread of IC cards has been prevented for the reasons mentioned above.

In order to solve these problems, compact IC card reader/writers that can be connected to personal computers have recently been used. That is, general purpose IC card readers have been used.

SUMMARY OF THE INVENTION

In order to solve the above mentioned problems, according to one example of the present invention, there are provided a clock control circuit for receiving a control signal and delaying the received control signal by a first delay time, and outputting the delayed control signal as a clock control signal; a delayed signal generating circuit for receiving the control signal and delaying said control signal by a second delay time which is longer than the first delay time, and outputting said delayed control signal as a delayed circuit, a power supply control signal for outputting a power supply control signal in response to one of either the control signal or the delayed signal; and a reset control circuit for outputting a reset control signal in response to both the control signal and the delayed signal.

According to this example of the present invention, various signals for controlling the operating state of an IC card are generated from one control signal from a host, such as a personal computer, and two signals having a first and second time delay from this control signal.

That is, the various signals mentioned above are hardware generated based on the control signal.

DETAILED DESCRIPTION OF THE INVENTION

Figure 2:
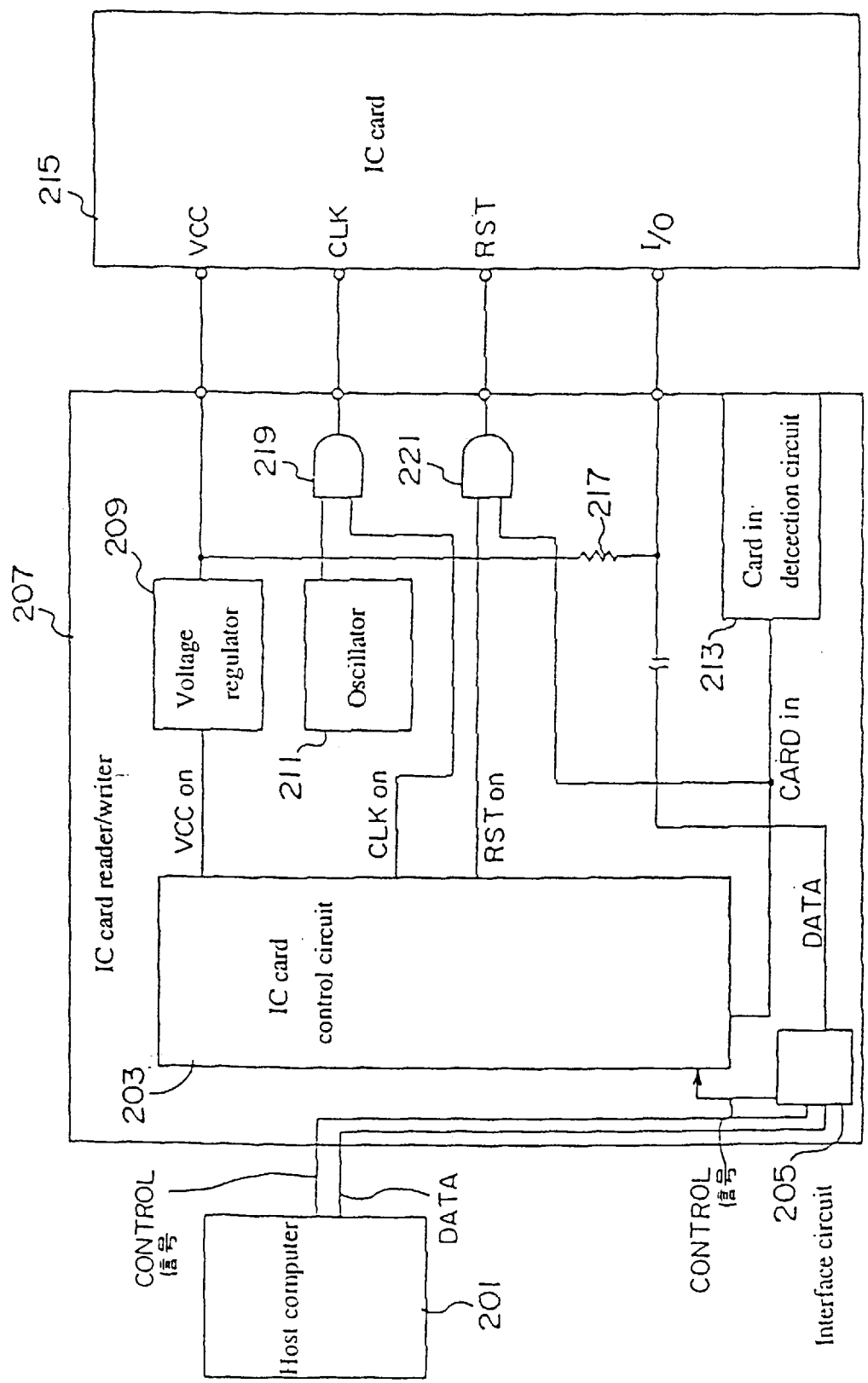
FIG. 2 is a diagram showing the connection relationship of the IC card control circuit of the present invention.

As shown in FIG. 2, the IC card 215 has a VCC terminal, a CLK terminal, a RST terminal, and an I/O terminal. The IC card 215 is activated or deactivated by supplying signals to these terminals in a sequence defined according to an ISO standard.

The IC card reader/writer 207 has an IC card control circuit according to the present invention 203, a voltage regulator 209, an oscillator 211, a card-in detection circuit 213, an interface circuit 205, a pull-up resistor 217, an AND gate 219 and an AND gate 221, and signals are supplied to each of the terminals of the IC card 215 in a sequence defined in the ISO standard.

The IC card control circuit 203 outputs a signal VCCon, for controlling whether or not a power supply VCC is supplied to the IC card 215, a signal CLKon, for controlling whether or not a clock CLK is supplied to the IC card 215, and a RSTon signal, for controlling whether or not a reset signal RST is supplied to the IC card 215. The detailed operation of the IC card control circuit will be described herein later.

The voltage regulator 209 generates the power supply voltage VCC in response to the VCCon signal, and supplies the power supply voltage VCC to the IC card 215. Also, when the voltage regulator 209 generates the power supply voltage VCC, the I/O terminal of the IC card 215 is pulled up to a high 'H' level (for example 5 V) via the pull-up resistor 217.

The oscillator circuit 211 generates an oscillating signal having a fixed frequency. The AND gate 219 carries out a logical product operation (an AND operation) on this oscillating signal and the CLKon signal, and the result is supplied to the CLK terminal of the IC card 215 as a clock CLK signal.

The AND gate 221 carries out a logical product operation on the RSTon signal and the CARDin signal, and the result is supplied to the RST terminal of the IC card 215 as a reset RST signal.

The card-in detection circuit 213 detects that an IC card 215 has been inserted into the IC card reader/writer 207, and the result is supplied as the CARDin signal to the AND gate 221 and the IC card control circuit 203.

The interface circuit 205 converts data signal levels handled on the IC card 215 and IC card reader/writer 207 side (for example 0 v~5 v), into data signal levels handled on the host computer side (for example, −10 V~10 V), and data signal levels handled on the host computer side into data signal levels handled on the IC card 215 and IC card reader/writer 207 side. The interface circuit 205 also converts the levels of Control signals output from the host computer into signal levels used on the IC card reader/writer 207 side.

The host computer 201 receives serial data from the IC card 215 via the interface circuit 205, processes the received data, and transmits serial data to the IC card 215 via the interface circuit 205. The host computer 201 also outputs Control signals for controlling the operation of the IC card reader/writer 207.

Figure 3:
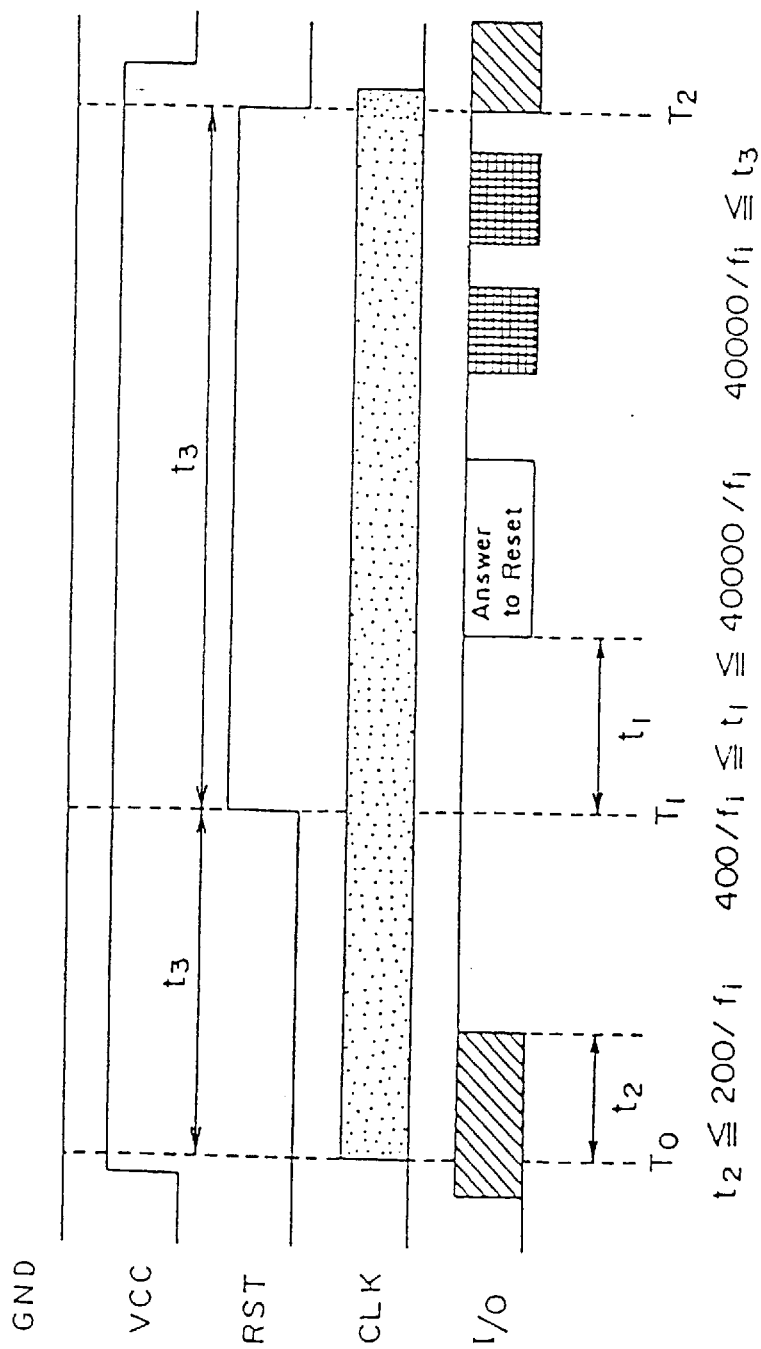
FIG. 3 is a timing diagram showing the IC card activation/deactivation sequence.

The IC card 215 utilizes the IC card reader/writer 207 in the manner described above, and the activation/deactivation is controlled in compliance with a sequence being defined in the ISO standard as shown in FIG. 3.

The sequence for activating/deactivating the IC card defined in the ISO standard is as shown below (refer to FIG. 3).
1. Insert IC card into IC card reader/writer.
2. Supply power supply (VCC) from IC card reader/writer to IC card.
3. Supply clock (CLK) from IC card reader/writer to IC card (time T0).
4. Set I/O terminal of IC card to 'H' level within 200 clock cycles (=200 cycles) of time T0 at the latest.
5. Maintain the RST terminal of the IC card at an 'L' level for 40,000 clock cycles from time T0, and set it to an 'H' level after that (time T1).
6. Output Answer to Reset signal from the I/O terminal within 400~40,000 clock cycles from time T1.

The IC card is activated by the above procedure. When deactivating the IC card, each terminal of the IC card is made an 'L' level in the reverse order to the activation procedure, in other words, in the order RST, CLK and VCC, to deactivate the IC card.

First Embodiment

A first embodiment of the present invention will now be described.

Figure 1:
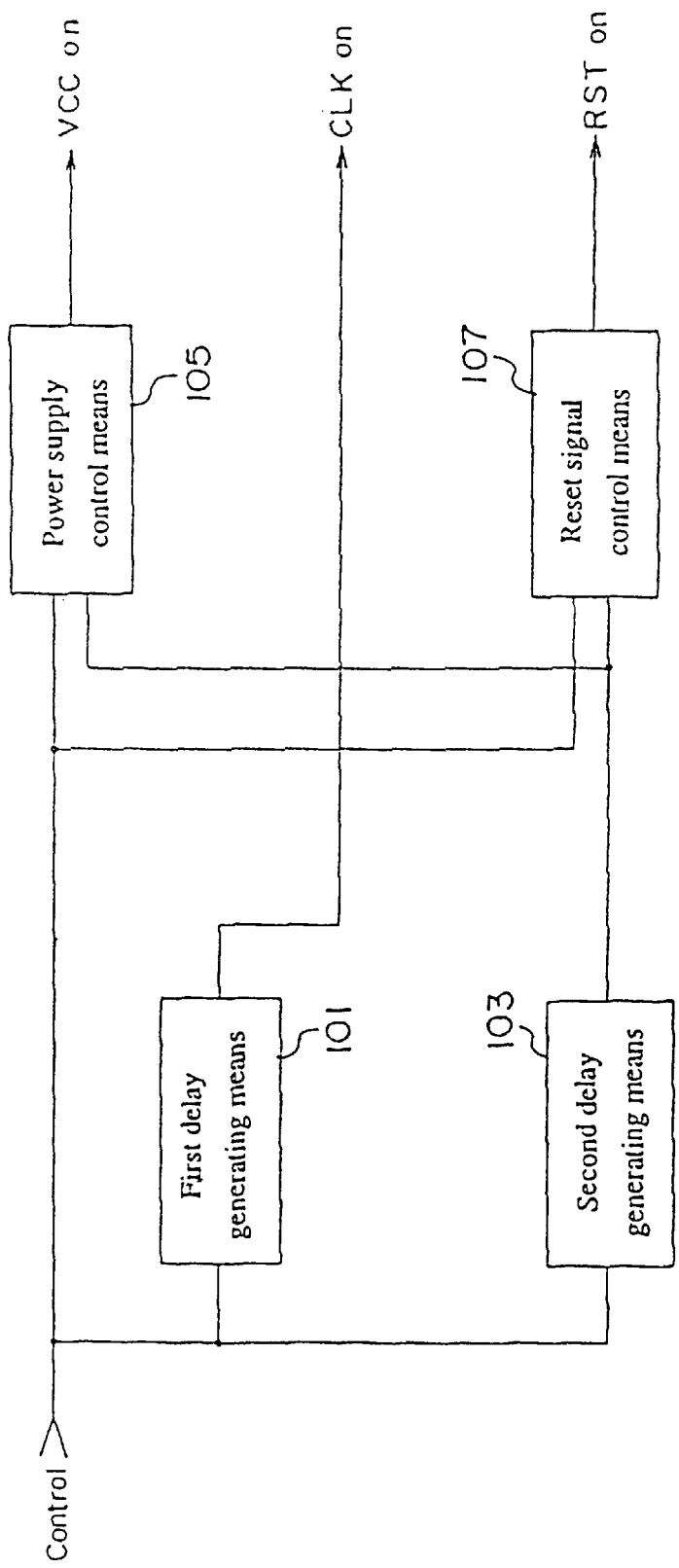
FIG. 1 is a block diagram of a first embodiment of the present invention.

FIG. 1 is a block diagram showing the first embodiment of the present invention.

As shown in FIG. 1, the present invention has first delay generating means 101, second delay generating means 103, power supply control means 105, and reset signal control means 107.

The first delay generating means 101 generates a first delayed signal from a Control signal from a host such as a personal computer. The first delayed signal output from the first delay generating means 101 is then used as a CLKon signal for controlling whether or not a clock CLK is supplied to the IC card 215. The second delay generating means 103 generates a second delayed signal from the Control signal.

The power supply control means 105 receives the output of the second delay generating means (second delayed signal) and the Control signal as inputs, and outputs a VCCon signal for controlling whether or not the power supply voltage VCC is supplied to the IC card 215.

The reset signal control means 107 receives the output of the second delay generating means (second delayed signal) and the Control signal as inputs, and outputs an RSTon signal for controlling whether or not the reset signal RST is supplied to the IC card 215.

Figure 4:
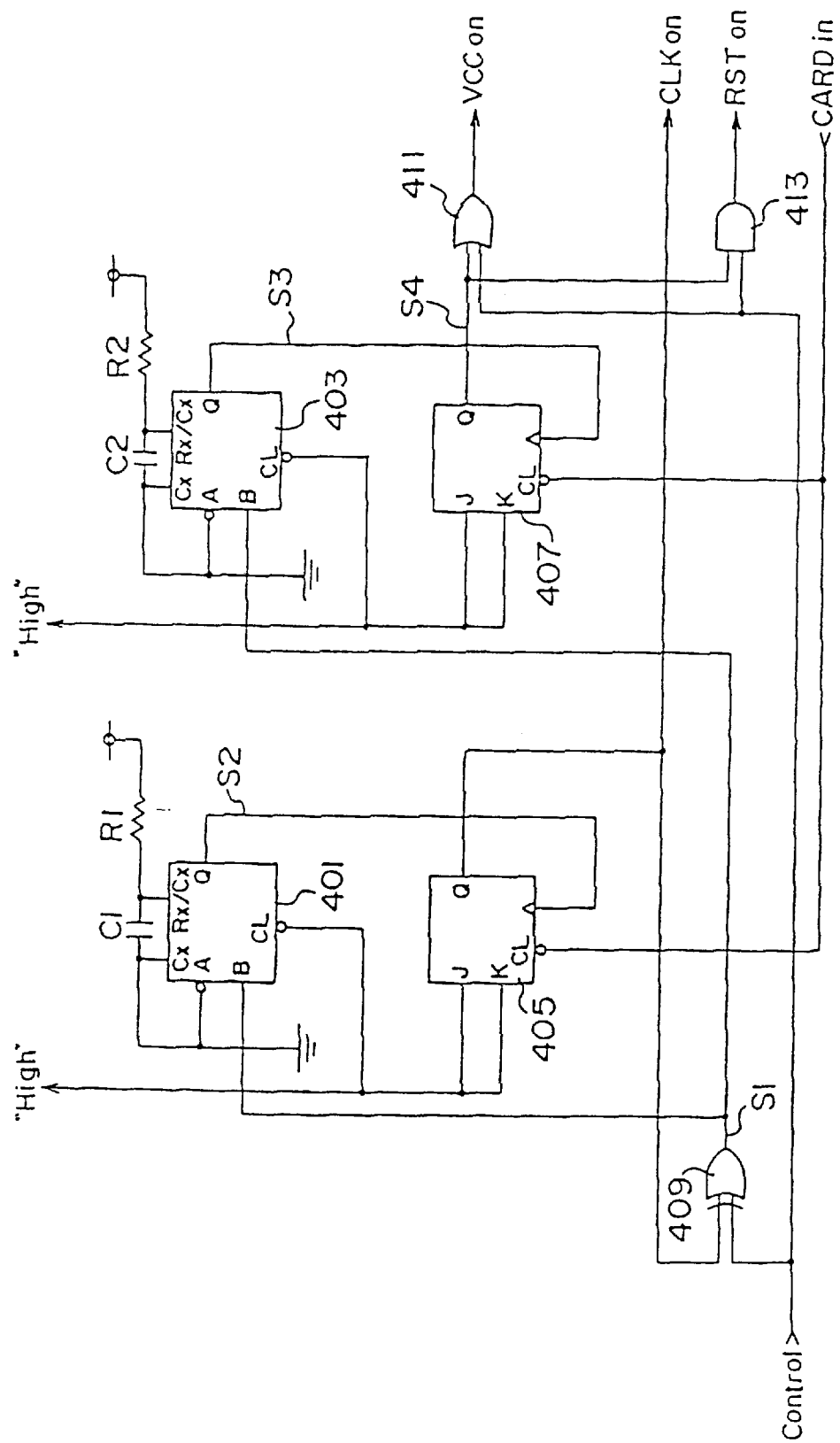
FIG. 4 is a circuit diagram of the first embodiment of the present invention.

FIG. 4 is a specific circuit diagram of the block diagram shown in FIG. 1.

As shown in FIG. 4, the present invention mainly uses monostable multivibrators 401, 403, flip-flops 405, 407, resistors R1, R2 and capacitors C1, C2 as the circuit for generating each of the VCCon signal, the CLK signal and the RSTon signal from the Control signal. Namely, each of the VCCon signal, the CLKon signal and the RSTon signal are generated using time constants determined by the resistance values of resistors R1, R2 and the capacitance values of capacitors C1 and C2. The operation will be described herein later.

The first monostable multivibrator 401 has an output terminal Q connected to a clock terminal of a first flip-flop 405, an A terminal which is pulled down, a terminal B connected to the output of a 2-input Exclusive-OR gate 409, a clear CL terminal which is pulled up to an 'H' level, and terminals connecting resistor R1 and capacitor C1.

The first flip-flop 405 is a J-K flip-flop, and has J and K terminals pulled up to an 'H' level, a clock terminal connected to the output terminal Q of the first monostable multivibrator 401, a clear terminal CL supplied with a CARDin signal, and an output terminal Q connected to provide a CLKon signal to an input terminal of the 2-input Exclusive-OR gate 409.

The connection relationship between the second monostable multivibrator 403 and the second flip-flop 407 is almost the same as that for the first monostable multivibrator 401 and the first flip-flop 405 and can be easily understood from FIG. 4, so an explanation will be omitted.

The 2-input Exclusive-OR gate 409 has a first input terminal supplied with a control signal, a second input terminal supplied with a CLKon signal, and an output terminal connected to provide signal S1 the B terminal of the first monostable multivibrator 401 and the B terminal of the second monostable multivibrator 403.

The 2-input OR gate 411 has a first input terminal supplied with the Control signal, a second input terminal connected to receive signal S4 from the Q output terminal of the second flip-flop 407, and an output terminal from which a VCCon signal is output.

The 2-input AND gate 413 has a first input terminal supplied with the Control signal, a second input terminal connected to receive signal S4 from the Q output terminal of the second flip-flop 407, and an output terminal from which an RSTon signal is output.

The VCCon signal mentioned above can be directly supplied as the IC card power supply, and can be used as shown in FIG. 2, for example, as the signal for ON/OFF control of the voltage regulator 209. The CLKon signal can be used as a signal for oscillating ON/OFF control of, for example, a crystal oscillator. As shown in FIG. 2, CLKon can also be used as the signal input to the AND gate 219 to control transmission after the clock signal is output from the oscillator 211 (crystal oscillator, etc.). The RSTon signal mentioned above can be used directly as a Reset/Set signal (simply called Reset Signal) for the IC card 215, for example, as shown in FIG. 2, the two signals RSTon and CARDin are input to the 2-input AND gate 221, and the output of this 2-input AND gate can be used as the Reset/Set signal for the IC card 215. However, the present invention is not limited to these configurations.

The monostable multivibrators 401, 403 and the flip-flops 405, 407 described in this embodiment of the present invention have been described as having CL terminals, but it is also possible to use devices that do not have a CL terminal, providing that these devices have the functions necessary for generating a delay.

Figure 5:
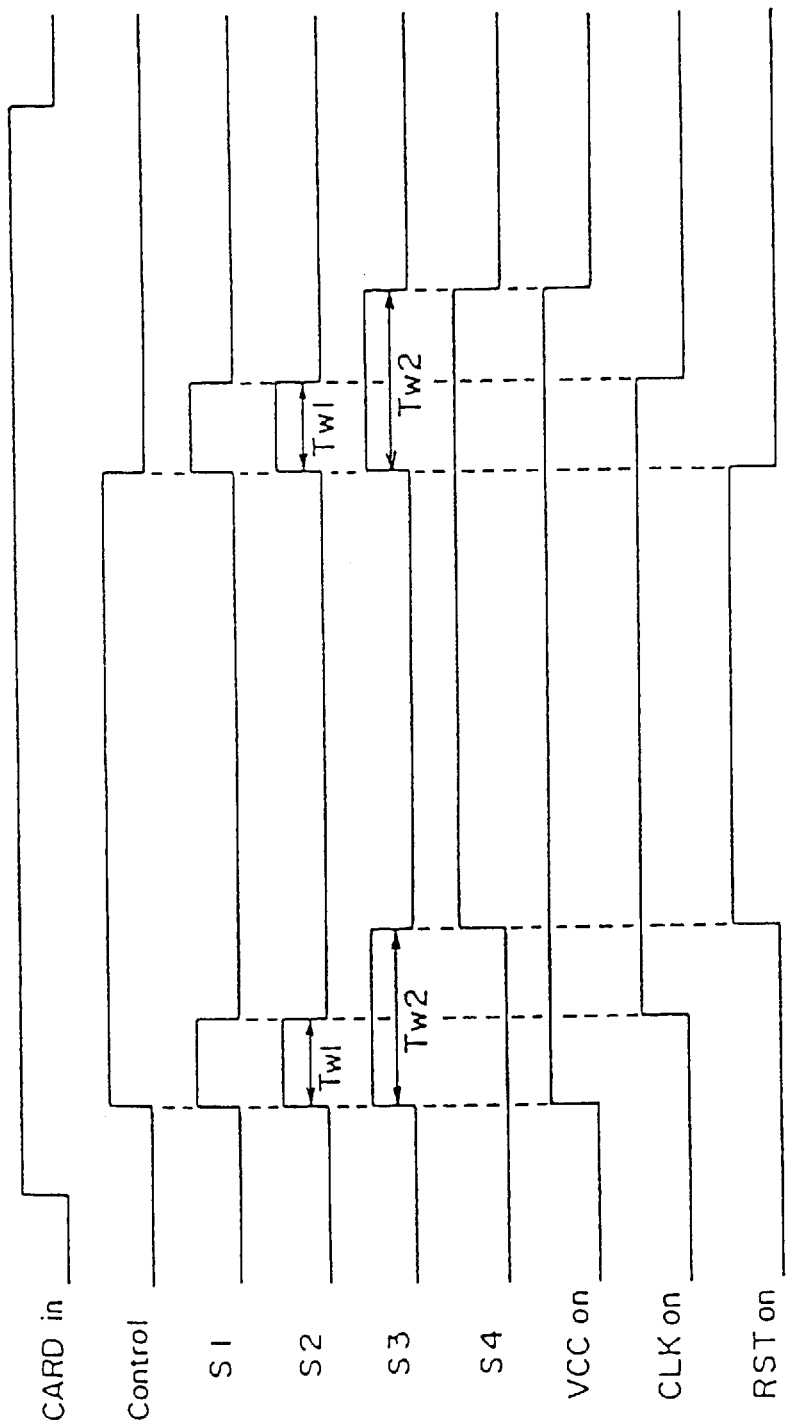
FIG. 5 is a timing chart for describing the operation of the circuit of FIG. 4.

Next, the operation of the first embodiment of the present invention (FIG. 4) will be described based on the timing chart of FIG. 5. The circuit of FIG. 4 will be explained as being included within the IC card reader/writer 207 shown in FIG. 2.

First of all, the operation when the IC card 215 is initialized will be described. When the IC card 215 is inserted into the IC card reader/writer 207, the CARDin signal becomes an 'H' level (for example, 5 V). When the CARDin signal becomes 'H', the first and second flip-flops 405 and 407 are put into an operating state. Next, when the Control signal becomes an 'H' level, the output of the 2-input Exclusive-OR gate (signal S1) also becomes an 'H' level. The VCCon signal also becomes an 'H' level. With the rising edge of signal S1 as a trigger, the first and second monostable multivibrators 401 and 403 set the signals S2 and S3 which are only output for the time periods Tw1 and Tw2 to an 'H' level. These periods Tw1 and Tw2 are respectively determined by the values of the resistors and capacitors connected to the first and second monostable multivibrators. If devices MSM74HC123A manufactured by OKI Electric Co. Ltd. are used as the monostable multivibrators 402 and 403, Tw1 becomes approximately C1×R1, and Tw2 becomes approximately C2×R2. After the period of time Tw1 has elapsed, the first flip-flop 405 detects the trailing edge of signal S2 and outputs an 'H' level. Accordingly, the CLKon signal is inverted from an 'L' level (for example 0 V) to an 'H' level. When the CLKon signal becomes an 'H' level, the signal S1 at the output of the 2-input Exclusive-OR gate 409 becomes an 'L' level. After the period of time Tw2 has elapsed, the second flip-flop 407 detects the trailing edge of signal S3 and outputs an 'H' level. That is, the signal S4 at the output of the second flip-flop is inverted from an 'L' level to an 'H' level. Then, when the signal S4 becomes an 'H' level, the RSTon signal also becomes an 'H' level.

Because the time period from supplying the clock to the IC card 215 to the rising edge of the reset signal RST must be at least 40,000 clock cycles, according to the aforementioned ISO standard, in the first embodiment of the present invention, the values of resistors R1 and R2, and the capacitance values of capacitors C1 and C2 must be adjusted so that Tw1<Tw2, and (Tw2−Tw1) is at least 40,000 clock cycles. Generally, in the case of a clock of 3.579545 MHz applied to an IC card, the time for 40,000 clock cycles is 11.2 mS. If (Tw1−Tw1) is designed as 20 mS, taking into account the gate delay, gate resistance and capacitor tolerance error, the ISO standard will be satisfied. As an explanatory example of the time period of Tw1 and Tw2, if Tw1 is to be 20 mS and Tw2 is to be 40 mS, then in order to satisfy the standard, C1=0.1 $\mu$F, R1=200 K$\Omega$, C2=0.1 $\mu$F and R1=400K$\Omega$. However, the resistance and capacitance values are not limited to the values in this example.

According to the above described operation, the IC card 215 is activated by setting the VCCon signal, CLKon signal and RSTon signals to an 'H' level, in that order.

Next, the operation will be described for when the IC card 215 is deactivated. When the IC card 215 is deactivated, the Control signal from a host computer such as a personal computer becomes an 'L' level. When the Control signal becomes an 'L' level, the signal S1 becomes an 'H' level, and the RSTon signal becomes an 'L' level. With the rising edge of signal S1 as a trigger, the first and second monostable multivibrators 401 and 403 set the signals S2 and S3 which are only output for the time periods Tw1 and Tw2 to an 'H' level. As described above, these periods Tw1 and Tw2 are respectively determined by the values of the resistors R1 and R2 and capacitors C1 and C2 connected to the first and second monostable multivibrators. After the period of time Tw1 has elapsed, the first flip-flop 405 detects the trailing edge of signal S2 and outputs an 'L' level. Accordingly, the CLKon signal is inverted from an 'H' level to an 'L' level. When the CLKon signal becomes an 'L' level, the signal S1 at the output of the 2-input Exclusive-OR gate becomes an 'L' level. After the period of time Tw2 has elapsed, the second flip-flop 407 detects the trailing edge of signal S3 and outputs an 'L' level. That is, the signal S4 at the output of the second flip-flop is inverted from an 'H' level to an 'L' level. Then, when the signal S4 becomes an 'L' level, the VCCon signal becomes an 'L' level.

According to the above described operation, the IC card 215 is deactivated by setting the RSTon signal, CLKon signal and VCCon signals to an 'L' level, in that order.

Finally, the IC card 215 is removed from the IC card reader/writer 207 (the CARDin signal becomes an 'L' level) and processing is ended. If the deactivated IC card 215 is now inserted into the IC card reader/writer 207, the IC card can be activated again.

(Modified example 1 of the first embodiment)

As described above, the first embodiment has been explained having a configuration where the monostable multivibrators 401, 403 output an 'H' level on the rising edge of signal S1 at the output of the 2-input Exclusive-OR gate 409, but the present invention is not limited to the circuit of FIG. 4, and various modifications are possible. For example, as shown in the circuit diagram of FIG. 6, a 2-input Exclusive-NOR gate 609 can be used in place of the 2-input Exclusive-Or gate 409. In this case, the signal S1 at the output of the 2-input Exclusive-NOR gate 609 is supplied to the A terminals of first and second multivibrators 401 and 403, and the B terminals of the first and second multivibrators 401, and 403 are pulled up to an 'H' level. With this configuration, the signals S2 and S3 at the outputs of the first and second multivibrators 401 and 403 become 'H' levels on the trailing edge of the 2-input Exclusive-NOR gate 609.

Figure 6:
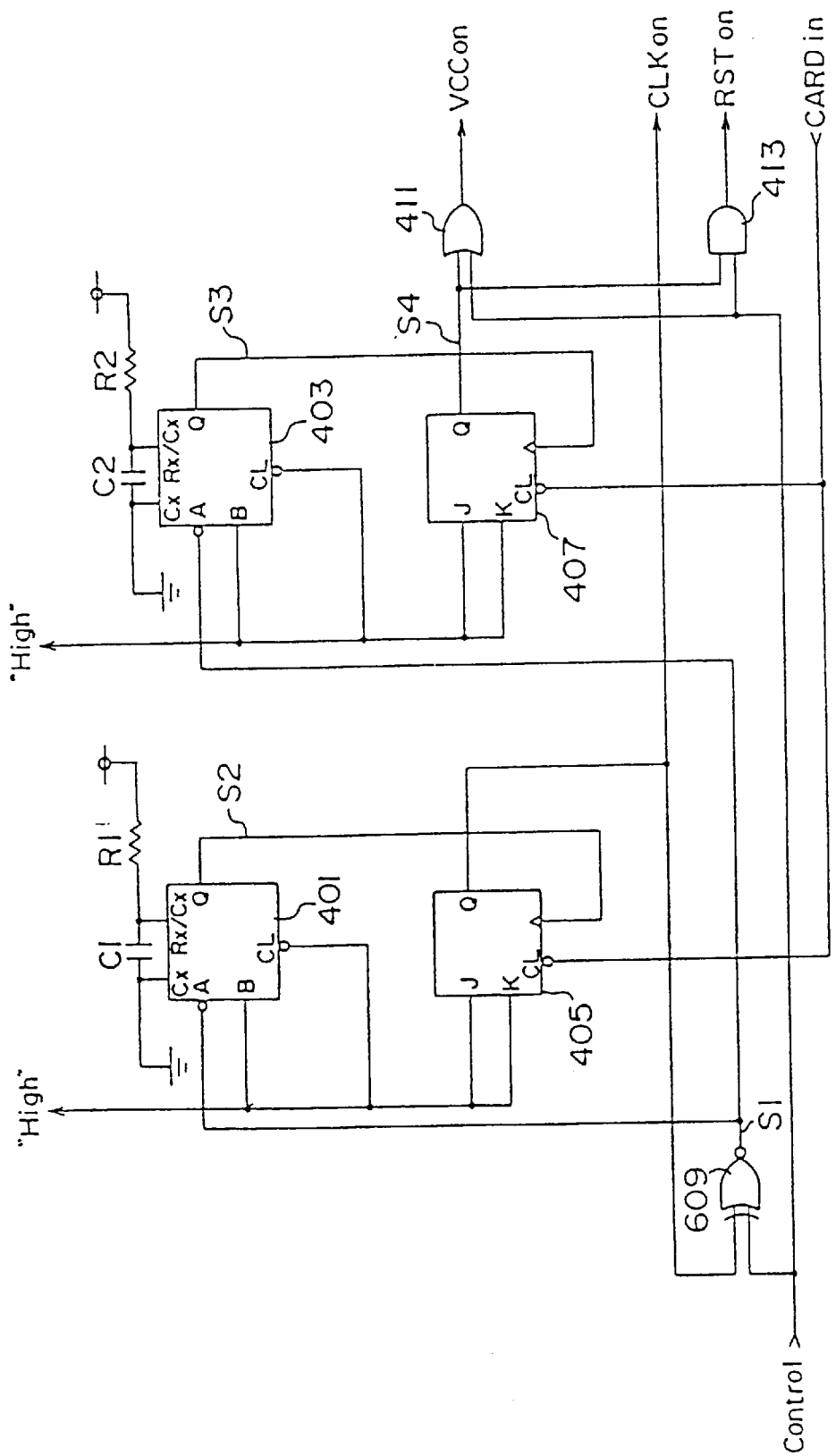
FIG. 6 is a circuit diagram showing modified example 1 of the first embodiment of the present invention.
Figure 7:
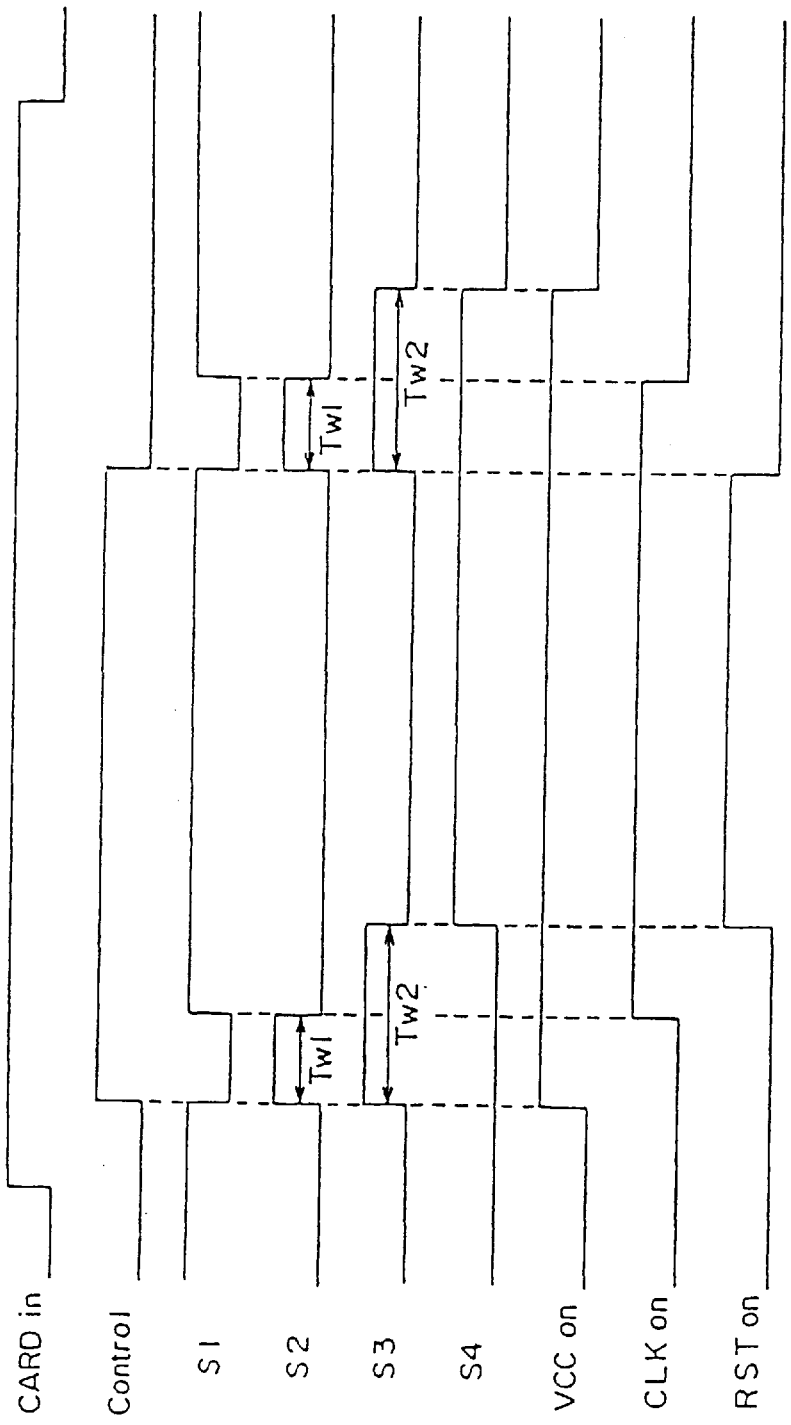
FIG. 7 is a timing chart for describing the operation of the circuit shown in FIG. 6.

FIG. 7 is a timing chart showing the operation of the circuit shown in FIG. 6. The only difference between this timing chart and the timing chart of FIG. 5 is that the VCCon signal, CLKon signal and RSTon signal are controlled by the trailing edge of signal S1. The rest of the operation is the same as for the circuit shown in FIG. 4 and can be simply understood, so any further description of the operation of the circuit shown in FIG. 6 is omitted.

(Modified example 2 of the first embodiment)

Figure 8:
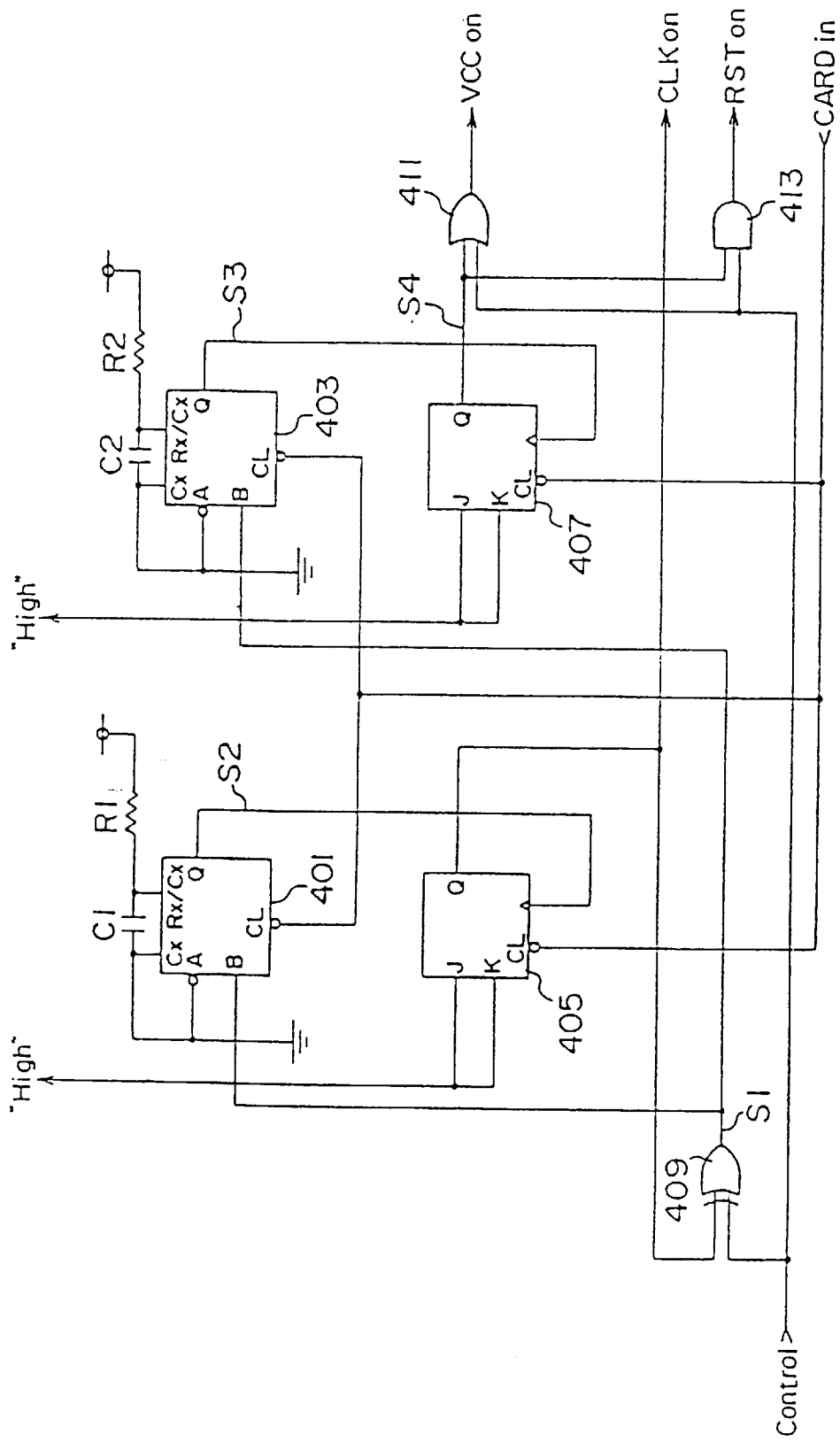
FIG. 8 is a circuit diagram showing modified example 2 of the first embodiment of the present invention.

The first embodiment of the present invention may also have the configuration as shown in the circuit diagram of FIG. 8, where the CARDin signal is input to the clear terminals CL of the first and second monostable multivibrators 401, 403 and the first and second flip-flops 405, 407. As a timing chart showing the operation of the circuit of FIG. 8 is the same as the timing chart of FIG. 5, description of the operation of the circuit of FIG. 8 will be omitted.

(Modified example 3 of the first embodiment)

Figure 9:
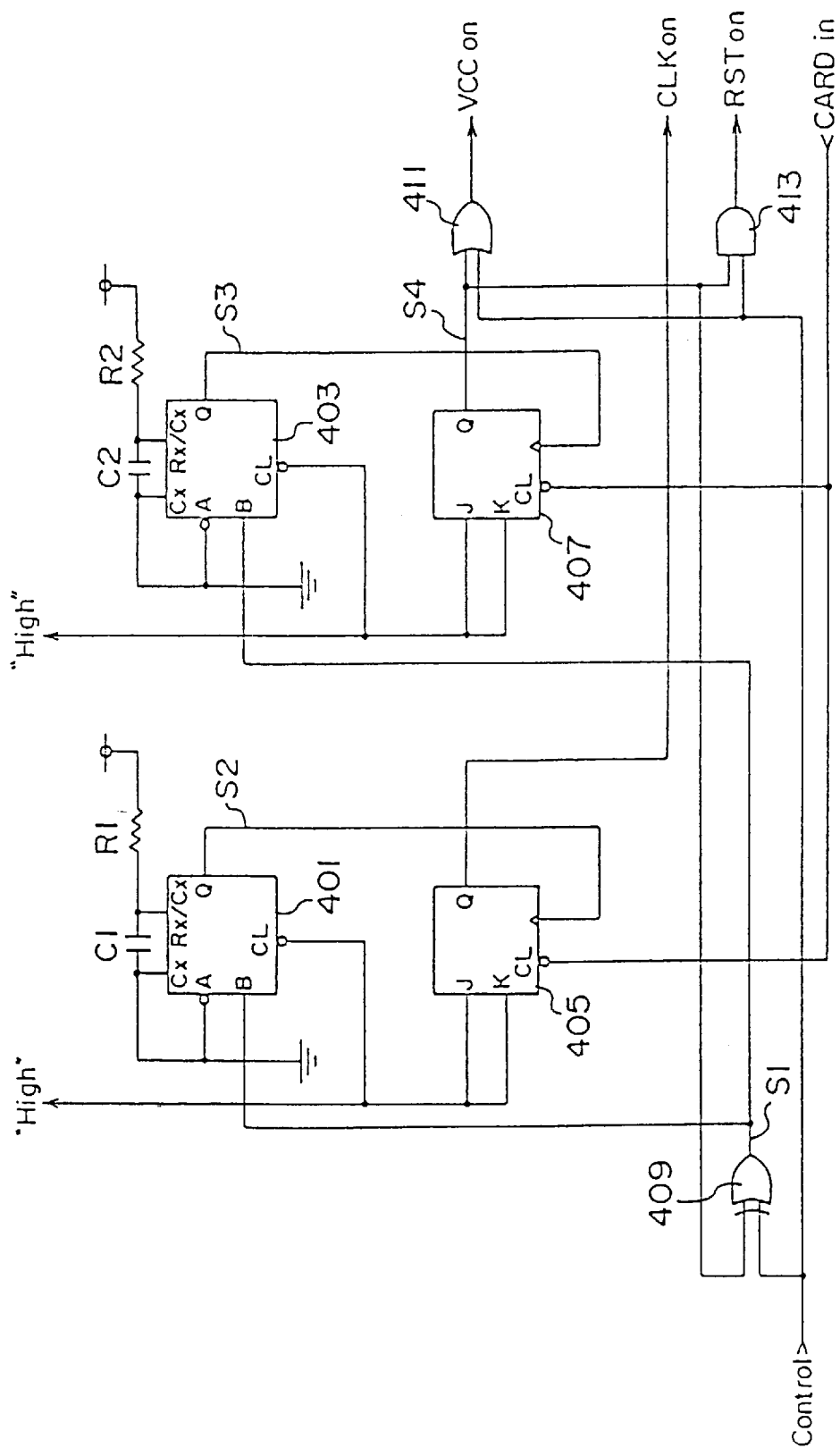
FIG. 9 is a circuit diagram showing modified example 3 of the first embodiment of the present invention.
Figure 10:
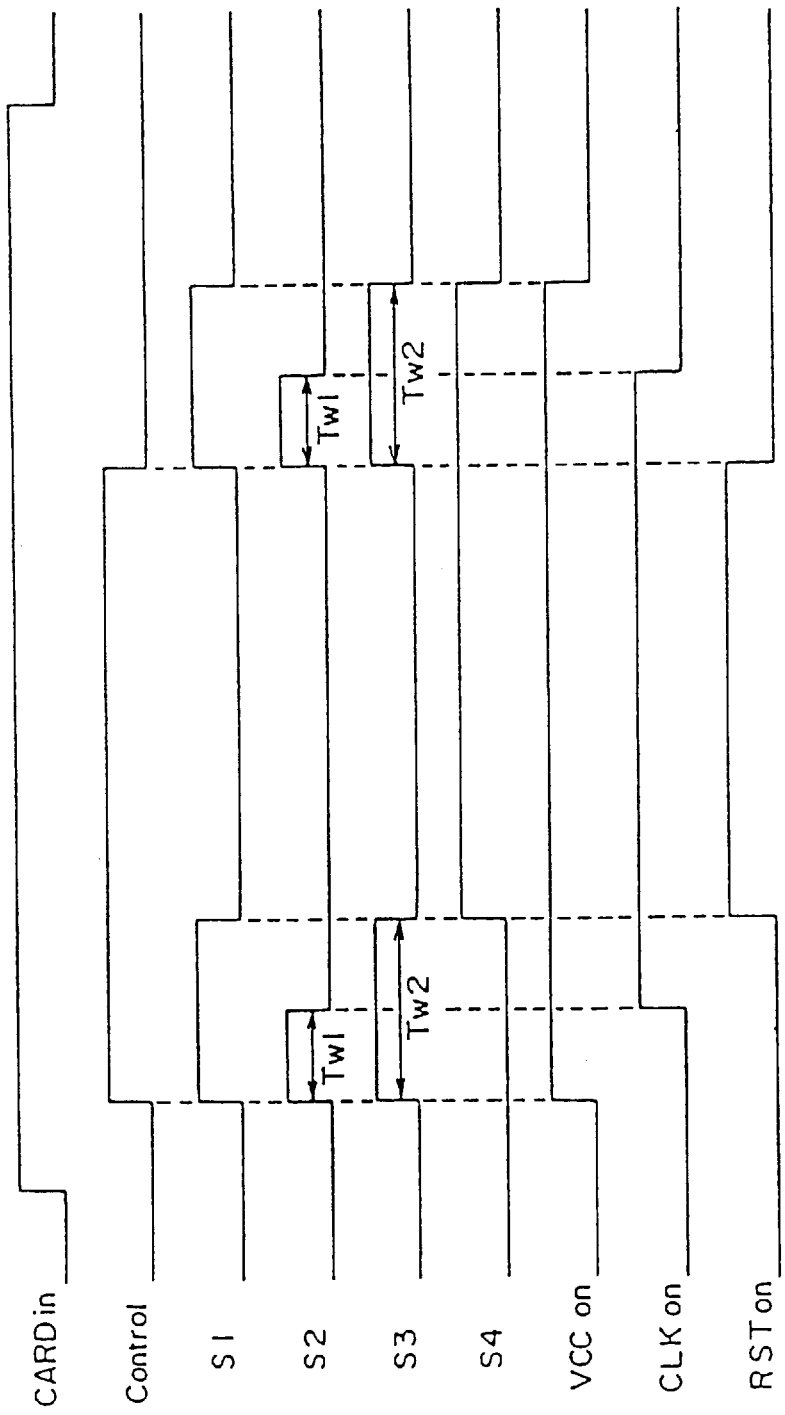
FIG. 10 is a timing chart for describing the operation of the circuit shown in FIG. 9.

The first embodiment of the present invention may also have the configuration as shown in the circuit diagram of FIG. 9, where the signal S4 is input to the second input of the 2-input Exclusive-OR gate 409 instead of the CLKon signal. The timing chart for this circuit is shown in FIG. 10. 12

(Modified example 3 of the first embodiment)

Figure 11:
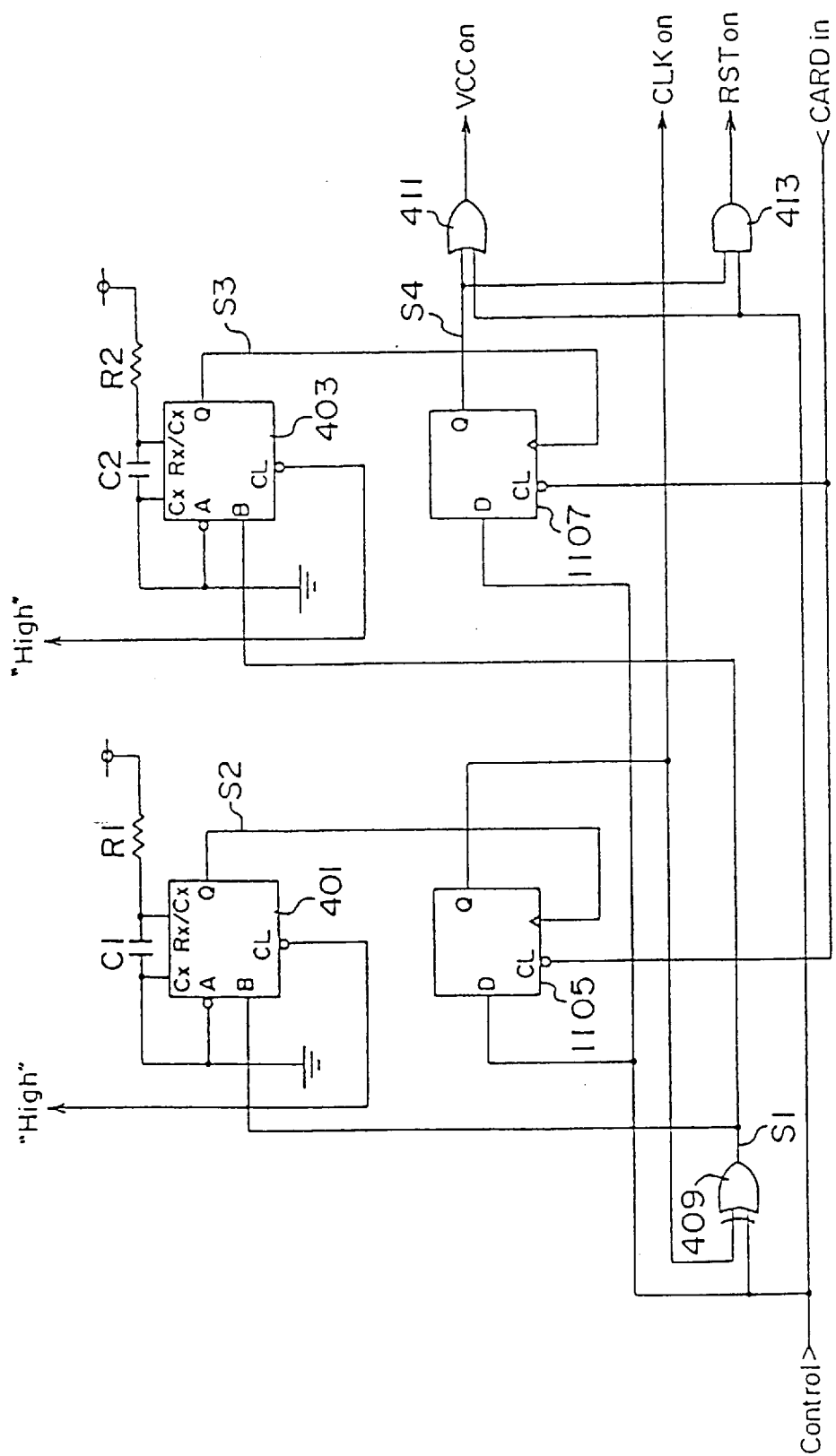
FIG. 11 is a circuit diagram showing modified example 4 of the first embodiment of the present invention.

The first embodiment of the present invention may also have the configuration as shown in the circuit diagram of FIG. 11, where falling edge triggered D-type flip-flops 1105 and 1107 are used instead of the JK flip-flops 405 and 407. In this case, the Control signal is supplied to the data terminals D of the D-type flip-flops 1105 and 1107. The timing chart of the circuit show in FIG. 11 is the same as the timing chart of FIG. 5, so the explanation will be omitted.

As has been explained above, according to the first embodiment of the present invention, and modifications thereof, even when there is only one Control signal from the host such as a personal computer (even when there is only one control line), an activation/deactivation sequence for an IC card defined in the ISO standard can be complied with, if special circumstances are excluded, without building in a CPU. As a result, because there is no longer any need to build in a CPU, firmware development costs and expensive components such as the CPU and memory become unnecessary, which means that the construction cost of the IC card reader/writer (IC card control circuit and IC card control system) can be suppressed. Also, the standard logic ICs such as monostable multivibrators described in the embodiment are small in size compared to a CPU or memory, etc., which means that they can be expected to have a useful effect when even more miniaturized IC card reader/writers (IC card control circuit and IC card control system) are required, for example, when including an IC card reader/writer (IC card control circuit and IC card control system) in devices having small internal space, such as notebook type personal computers, etc.

Further, the frequency of the clock supplied to the IC card is generally 3.579545 MHz or 4.9152 MHz, and a maximum of 5 MHz is stipulated in the ISO standard. As a result, if the time periods of Tw1 and Tw2 are previously set for the case when the frequency of the clock supplied to the IC card is 3.579545 MHz, there is no need to modify the delay time if the frequency of the clock supplied to the IC card is in the range 3.579545 MHz~5 MHz. Accordingly, with the frequency of the clock supplied to the IC card in the range 3.579545 MHz~5 MHz, the effect of being able to realize activation and deactivation of the IC card using the same circuit can be expected.

Form of the Second Embodiment

Figure 12:
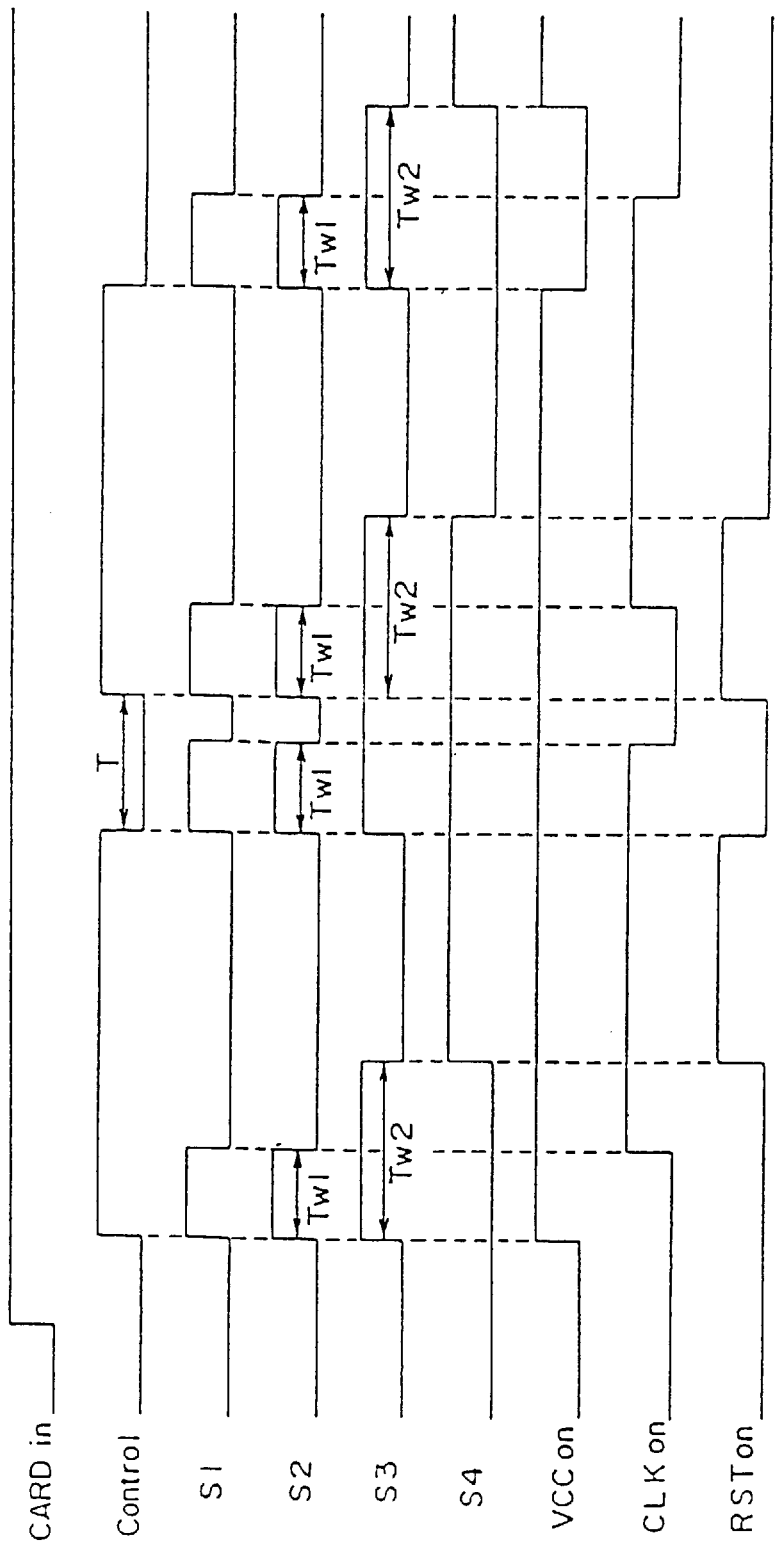
FIG. 12 is a timing chart for describing the operation of the circuit shown in FIG. 4.

In the first embodiment of the present invention, if the Control signal is made an 'H' level again very soon after it changes from an 'H' level to an 'L' level, a situation arises where the activation/deactivation sequence of the IC card 215 defined in the ISO standard is not complied with. The operation at this time will be described based on the timing chart of FIG. 12.

First of all, the IC card 215 is inserted into the IC card reader/writer 207. Following that, the Control signal is changed from an 'L' level to an 'H' level, and the IC card is initialized as shown in the timing chart of FIG. 12. The operation up to this point is the same as the timing chart of FIG. 5. Next, when the Control signal changes from an 'H' level to an 'L' level, the signal S1 becomes an 'H' level and the RSTon signal becomes an 'L' level. When the signal S1 becomes an 'H' level, in particular on the rising edge of S1, the first and second monostable multivibrators 401 and 403 set the signals S2 and S3 to a 'H' level for time periods Tw1 and Tw2, respectively. However, if the Control signal becomes an 'H' level before the trailing edge of signal S3 (the time period from when the Control signal becomes an 'L' level to when it becomes an 'H' level is T), the signal S1 once more becomes an 'H' level. With the rising edge of this signal S1 as a trigger, since the first and second monostable multivibrators output an 'H' level, signal S2 becomes 'H' for a second period Tw1. However, because the signal S1 has become an 'H' level while signal S3 still has not changed from the 'H' level to an 'L' level, signal S3 is maintained at an 'H' level for a further period Tw2 from the rising edge of signal S1 (T+Tw2). Namely, if time period T is shorter than Tw2, signal S2 changes from an 'L' level to an 'H' level in response to each rising edge of signal S1, but signal S3 only changes from an 'L' level to an 'H' level once. As a result the waveforms of the VCCon signal, the CLKon signal and the RSTon signal do not conform to the IC card activation/deactivation sequence defined in the ISO standard.

In order to improve the points mentioned above, the circuit shown in FIG. 13 has been considered.

Figure 13:
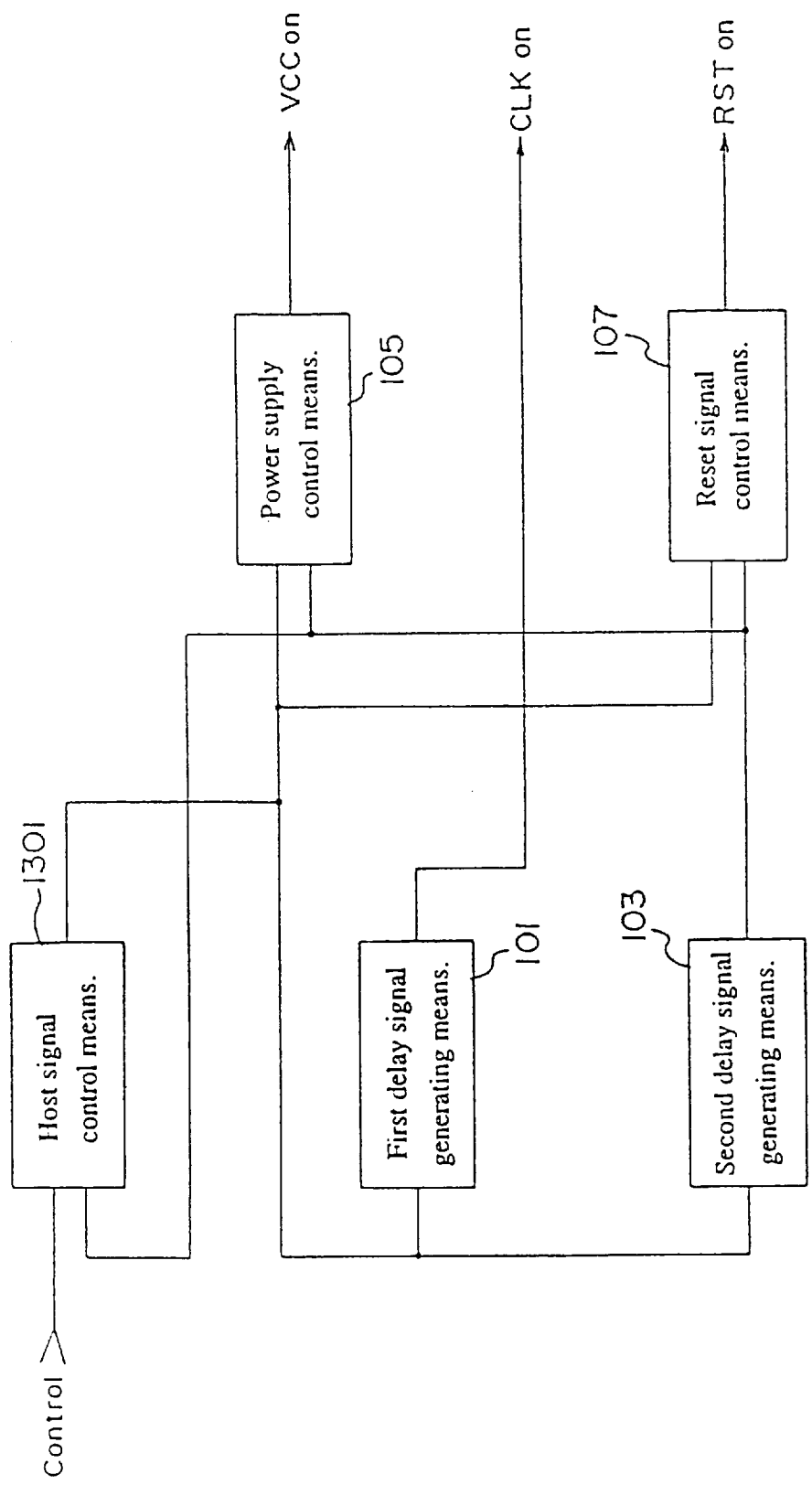
FIG. 13 is a block diagram of a second embodiment of the present invention.

FIG. 13 is a block diagram showing a second embodiment of the present invention.

As shown in FIG. 13, the second embodiment of the present invention is provided with host signal control means 1301, and the output of this host signal control of the first embodiment means 1301 is used in place of the Control signal.

The host signal control means 1301 receives the control signal and the output from the second delay signal generating means 103 as inputs. After the IC card 215 has been activated, and before the output of the second delay signal generating means 103 has become an 'L' level from an 'H' level, the host signal control means 1301 continues to output an 'L' level, even if the control signal has changed from an 'H' level, to an 'L' level and then back to an 'H' level. The host signal control means 1301 then outputs an 'H' level after the output of the second delay signal generating means 103 has fallen from an 'H' level to an 'L' level.

Figure 14:
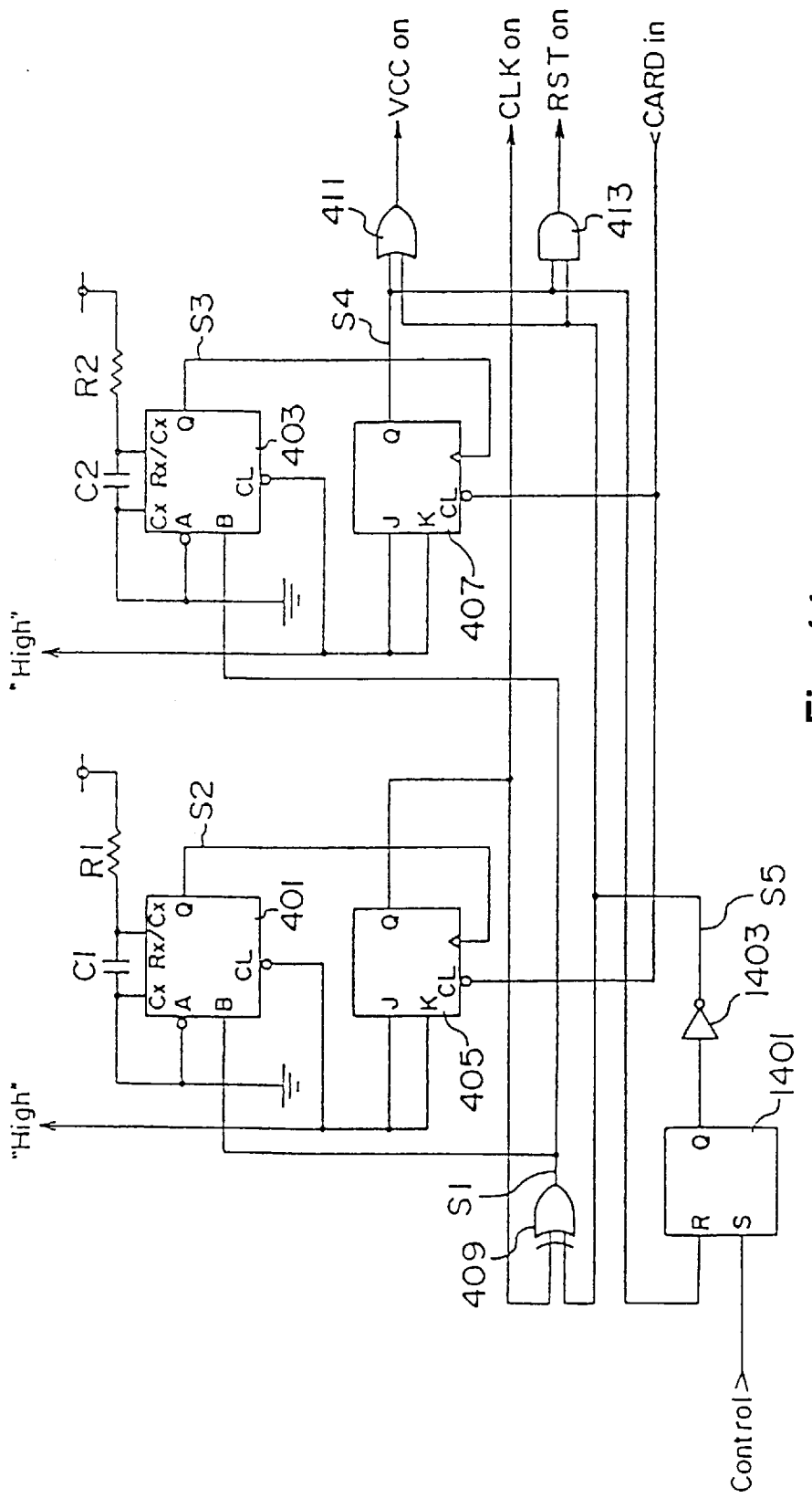
FIG. 14 is a circuit diagram of the second embodiment of the present invention.

FIG. 14 is a specific circuit diagram of the block diagram shown in FIG. 13.

A shown in FIG. 14, the present invention has an RS latch 1401 and an inverter 1403 added to the circuit of FIG. 4. The RS latch 1401 has a set terminal S supplied with the Control signal, a reset terminal R connected to the output terminal Q of the second flip-flop 407, and an output terminal Q. The inverter 1403 is connected between the output terminal Q of the RS latch 1401 and the 2-input Exclusive-OR gate 409.

Specifically, in the second embodiment of the present invention, the output of the inverter 1403 (Signal S5) is used in place of the Control signal of the first embodiment.

Figure 15:
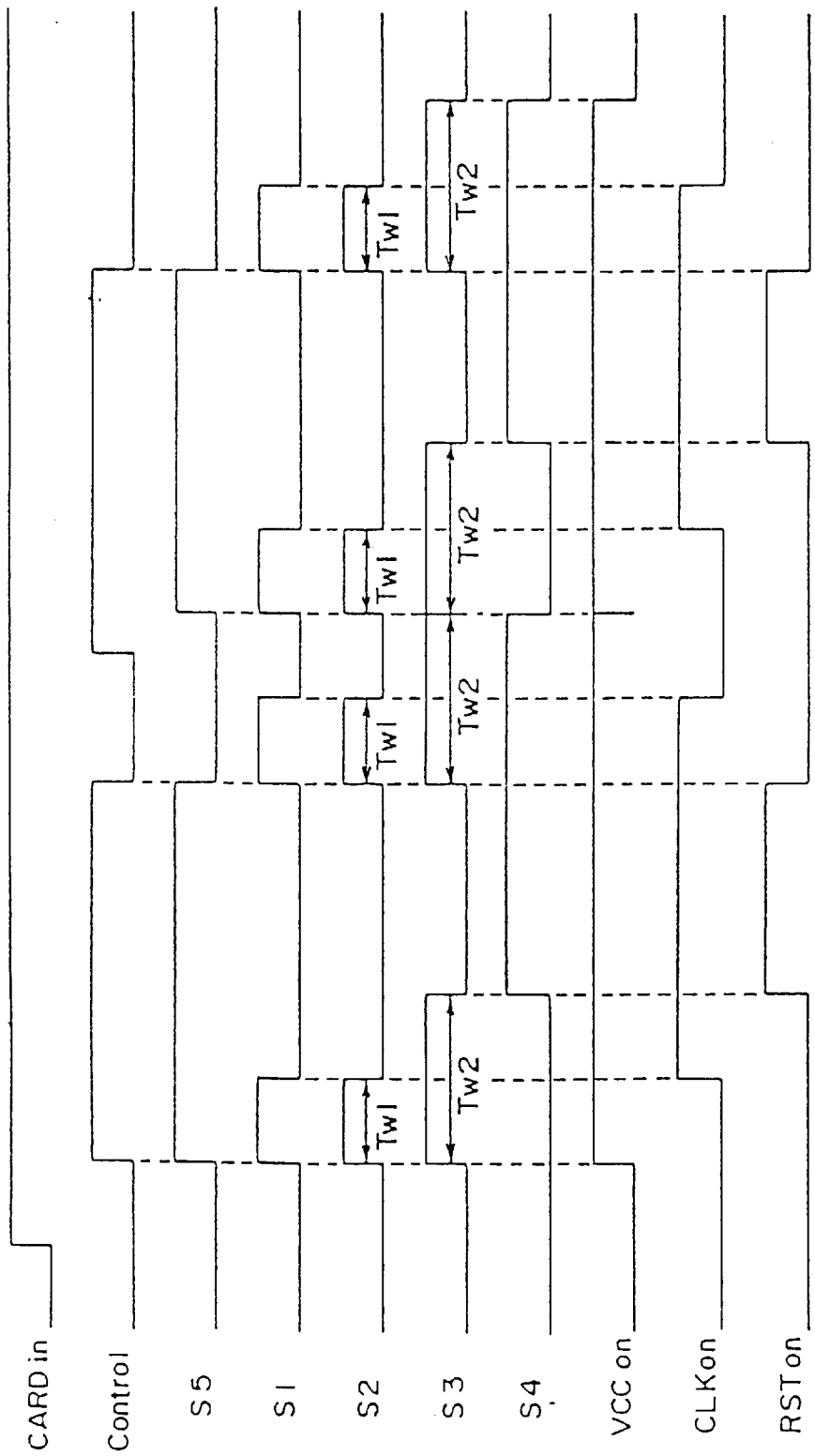
FIG. 15 is a timing chart for describing the operation of the circuit of FIG. 14.

Next, the operation of the second embodiment of the present invention will be described based on the timing chart of FIG. 15.

When the IC card 215 is inserted into the IC card reader/writer 207, the CARDin signal becomes a 'H' level (for example, 5 V). When the CARDin signal becomes 'H', the first and second flip-flops 405 and 407 are put into an operating state. Next, when the Control signal becomes an 'H' level, the RS latch 1401 takes in an 'L' level signal S4 and outputs an 'L' level. The inverter 1403 inverts the 'L' level output from the RS latch 1401 and outputs an 'H' level. Namely, when signal S4 is at a 'L' level, if the Control signal becomes an 'H' level, signal S5 also becomes an 'H' level.

When signal S5 becomes an 'H' level, the output of the 2-input Exclusive-Or gate 409 (signal S1) also becomes an 'H' level, as does the VCCon signal. With the rising edge of signal S1 as a trigger, the first monostable multivibrator 401 sets the signal S2, which is only output for the time period Tw1, to an 'H' level. Also, the second monostable multivibrator 403 sets the signal S3, which is only output for the time period Tw2, to an 'H' level.

After the period of time Tw1 has elapsed, the first flip-flop 405 detects the trailing edge of signal S2 and outputs an 'H' level. Accordingly, the CLKon signal is inverted from an 'L' level (for example 0 V) to an 'H' level. When the CLKon signal becomes an 'H' level, the signal S1 at the output of the 2-input Exclusive-OR gate becomes an 'L' level.

After the period of time Tw2 has elapsed, the second flip-flop 407 detects the trailing edge of signal S3 and outputs an 'H' level. That is, the signal S4 at the output of the second flip-flop 407 is inverted from an 'L' level to an 'H' level. Then, when the signal S4 becomes an 'H' level, the RSTon signal becomes an 'H' level.

As a result of this operation, similarly to the first embodiment, the IC card 215 is activated by setting the VCCon signal, CLKon signal and RSTon signals to an 'H' level, in that order.

Next, when the Control signal changes from an 'H' level to an 'L' level, the RS latch 1401 takes in signal S4 at an 'H' level and outputs an 'H' level. The inverter 1403 inverts the 'H' level output from the RS latch 1401 and outputs an 'L' level. Namely, when the signal S4 is at an 'H' level, if the Control signal becomes an 'L' level signal S5 also becomes an 'L' level.

When the signal S5 becomes an 'L' level, signal S1 rises to an 'H' level. Then, with the rising edge of this signal S1 as a trigger, the first monostable multivibrator 401 sets the signal S2, which is only output for the time period Tw1, to an 'H' level. Also, with the rising edge of this signal S1 as a trigger, the second monostable multivibrator 403 sets the signal S3, which is only output for the time period Tw2, to an 'H' level. When the signal S5 becomes an 'L' level, the RSTon signal becomes an 'L' level.

After the period of time Tw1 has elapsed, the first flip-flop 405 detects signal S2 falling to an 'L' level and outputs an 'L' level. As a result, the CLKon signal is inverted from an 'H' level to an 'L' level.

When the CLKon signal changes from an 'H' level to an 'L' level, the signal S1 becomes an 'L' level.

If the Control signal rises to an 'H' level once more before period Tw2 has elapsed, the RS latch 1401 takes in the signal S4 at an 'H' level and outputs an 'H' level. As a result, the signal S5 is maintained at an 'L' level regardless the Control signal being at an 'H' level.

After the period Tw2 has elapsed, the second flip-flop 407 detects the signal S3 falling to an 'L' level, and outputs an 'L' level. Accordingly, signal S4 falls from an 'H' level to an 'L' level.

When signal S4 falls to an 'L' level, the VCCon signal instantaneously falls to an 'L' level. However, when the signal S4 falls to an 'L' level the RS latch 1401 outputs an 'L' level, so the inverter 1403 receives this 'L' level output from the RS latch 1401 and outputs an 'H' level. Accordingly, the VCCon signal immediately rises to an 'H' level.

At the same time, if signal S5 becomes an 'H' level, signal S1 rises to an 'H' level. With this rising edge of signal S1 as a trigger, the first monostable multivibrator 401 sets the signal S2 to a high level again only for period Tw1. Also using this rising edge of signal S1 as a trigger, the second monostable multivibrator 403 sets the signal S3 to an 'H' level again, only for period Tw2. After this, the operation is the same as that described above up to the activation of the IC card 215, and activation of the IC card 215 is carried out again.

Namely, the signal S3 and the VCCon signal immediately rise to an 'H' level after momentarily falling to an 'L' level.

After this, the operation for deactivating the IC card 215 is the same as that for the first embodiment, and so explanation thereof will be omitted.

The second embodiment has been described using the circuit of FIG. 14, but it is also possible to apply circuits such as those described in FIGS. 6, 8, 9 and 11 as modified examples of the first embodiment, for example.

As has been described in detail above, according to the second embodiment of the present invention, host signal control means 1301 is provided, which means that limits are no longer placed on the time from the Control signal becoming an 'L' level to being set to an 'H' level. Accordingly, there is no need to limit the software, and software development can be simplified.

Third Embodiment.

In the case of the first embodiment of the present invention, the setting of the signals S2 and S3 to an 'H' level is realized by the first and second multivibrators 401 and 403 detecting that the signal S1 rises from an 'L' level to an 'H' level. However, because the values of the resistors and capacitors can have large fluctuations due to temperature variations and voltage variations, the time periods Tw1 and Tw2 for which the signals S2 and S3 are at an "H" level change depending on the circumstances, and it is possible that Tw1 may become longer than Tw2. In that case, the waveforms of the VCCon signal, CLKon signal and RSTon signal do not conform to the IC card activation/deactivation sequence defined in the ISO standard.

Figure 16:
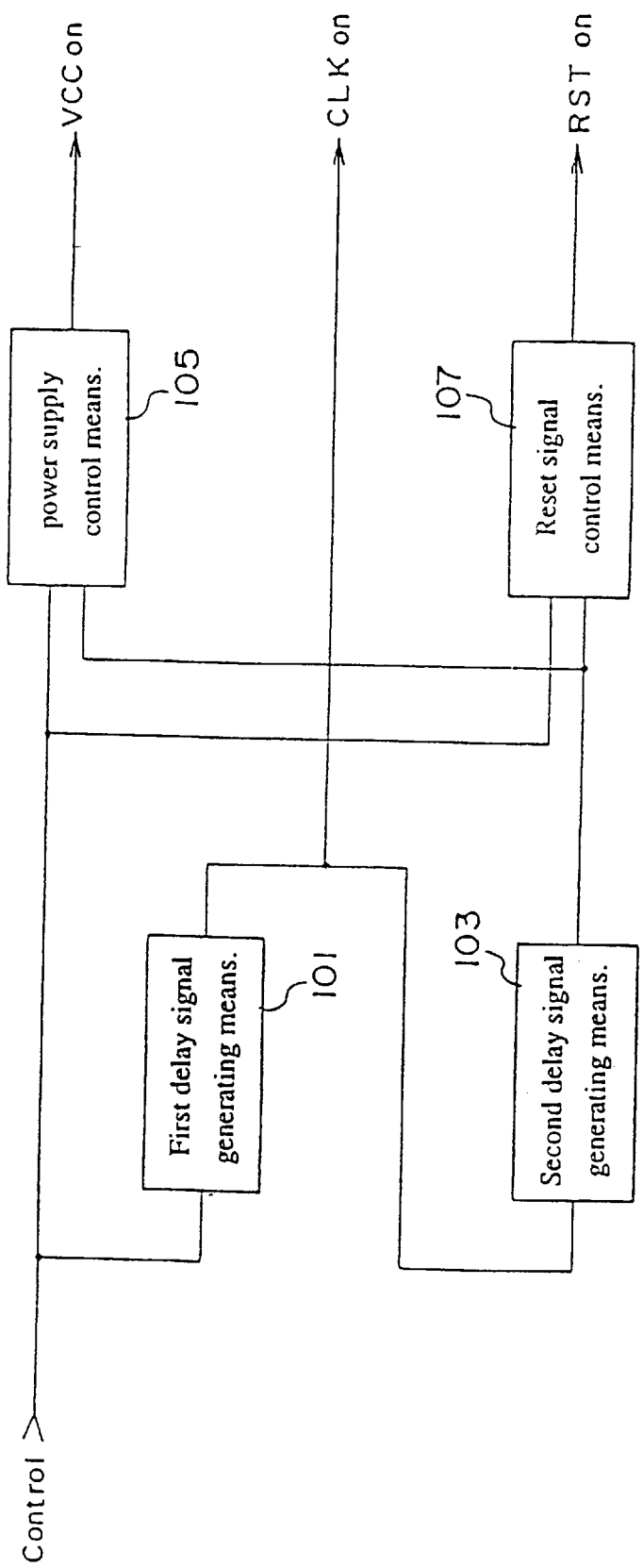
FIG. 16 is a block diagram of a third embodiment of the present invention.

The circuit shown in FIG. 16 has been proposed to improve the above mentioned point.

FIG. 16 is a block diagram showing the third embodiment of the present invention.

As shown in FIG. 16, in the third embodiment of the present invention, the second delay signal generating means 103 is supplied with the output of the first delay signal generating means 101, instead of the Control signal in the first embodiment shown in FIG. 1.

Figure 17:
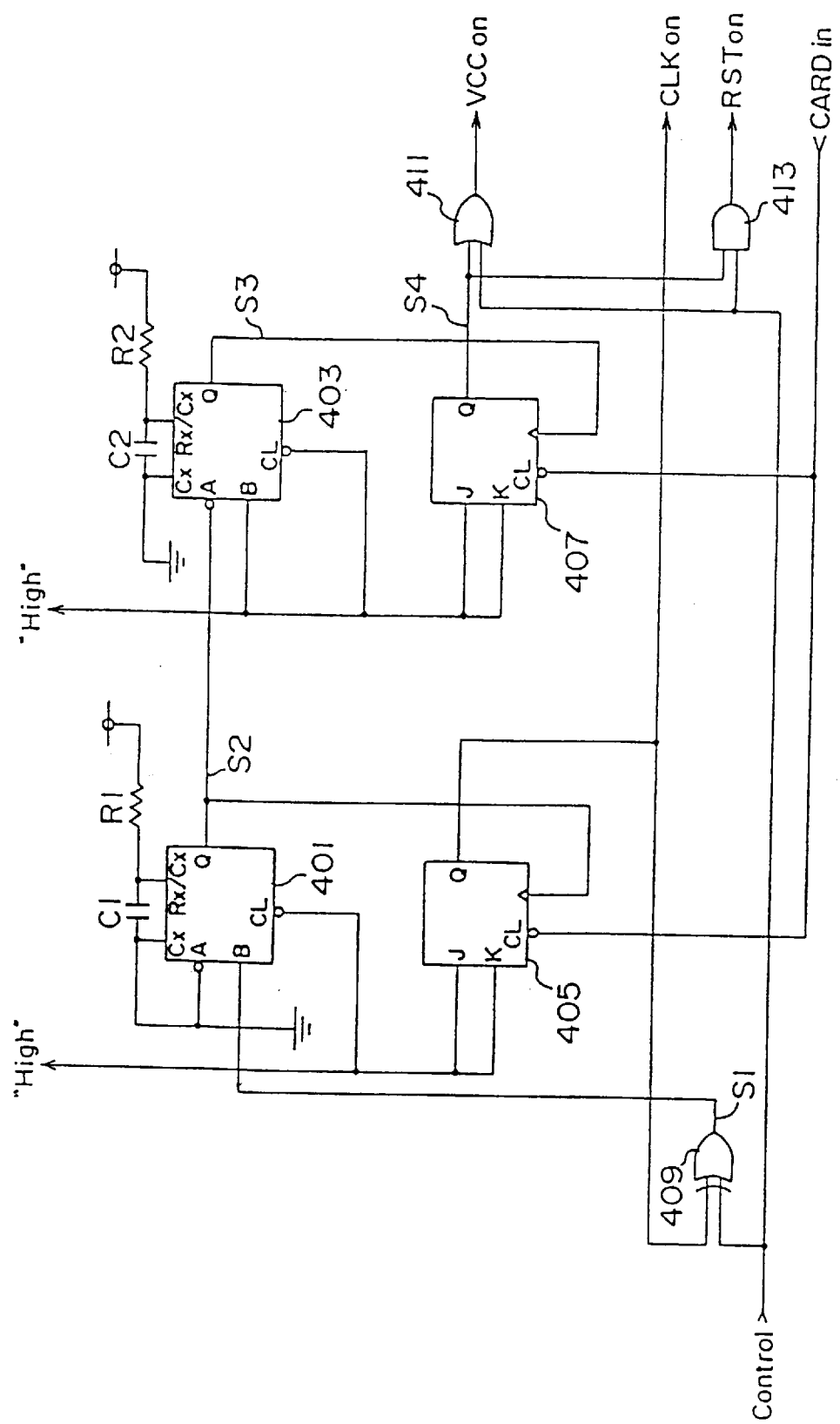
FIG. 17 is a circuit diagram of the third embodiment of the present invention.

FIG. 17 is a specific circuit diagram of the block diagram shown in FIG. 16.

As shown in FIG. 17, the present invention has the A terminal of the second monostable multivibrator 403 of the circuit shown in FIG. 4 connected the output terminal Q of the first monostable multivibrator 401. Specifically, the second monostable multivibrator 403 outputs an 'H' level for time period Tw2 after the first monostable multivibrator 401 has output an 'H' level for time period Tw1. The remaining configuration is the same as the circuit diagram of the first embodiment shown in FIG. 4, and so description will be omitted.

Figure 18:
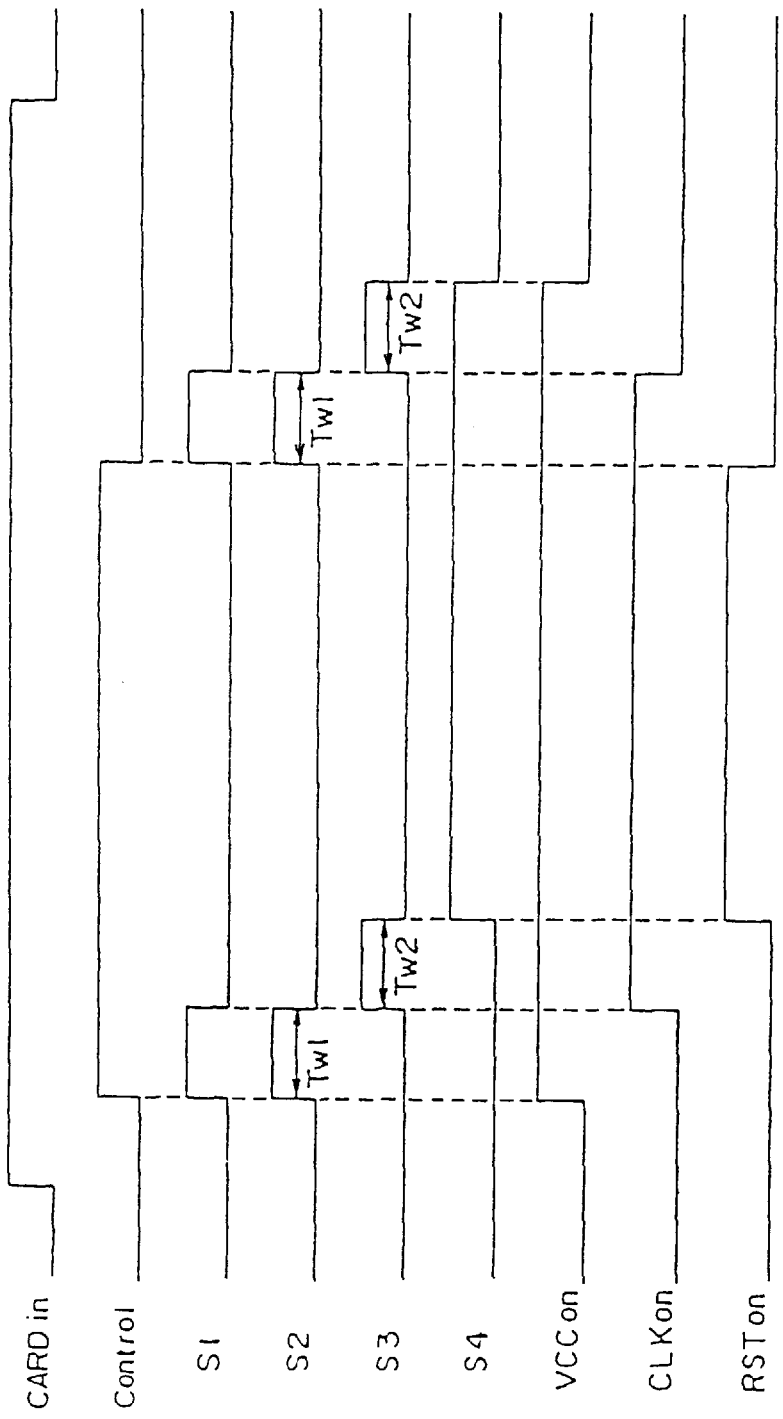
FIG. 18 is a timing chart for describing the operation of the circuit of FIG. 17.

Next, the operation of the third embodiment of the present invention will be described based on the timing chart of FIG. 18.

Similarly to the first embodiment, the circuit shown in FIG. 18 will be described as being incorporated into an IC card reader/writer 207.

First of all, the operation when the IC card 215 is initialized will be described. When the IC card 215 is inserted into the IC card reader/writer 207, the CARDin signal becomes an 'H' level (for example, 5 V). When the CARDin signal becomes 'H', the first and second flip-flops 405 and 407 are put into an operating state. Next, when the Control signal becomes an 'H' level, the output of the 2-input Exclusive-OR gate (signal S1) also becomes an 'H' level. The VCCon signal also becomes an 'H' level. With the rising edge of signal S1 as a trigger, the first monostable multivibrator 401 sets the signal S2 at the output to an 'H' level only for the time period Tw1.

After the period of time Tw1 has elapsed, the first flip-flop 405 detects the trailing edge of signal S2 and outputs an 'H' level. Accordingly, the CLKon signal is inverted from an 'L' level (for example 0 V) to an 'H' level. When the CLKon signal becomes an 'H' level, the signal S1 at the output of the 2-input Exclusive-OR gate 409 becomes an 'L' level.

At the same time, the second monostable multivibrator 403 detects signal S2 falling to an 'L' level, and outputs an 'H' level signal S3 only for time period Tw2.

After period Tw2 has elapsed, the second flip-flop 407 detects the signal S3 falling to an 'L' level and outputs an 'H' level signal S4. If the signal S4 then becomes an 'H' level, the RSTon signal becomes an 'H' level.

According to the above described operation, the IC card 215 is activated by setting the VCCon signal, CLKon signal and RSTon signals to an 'H' level, in that order.

Next, the operation will be described for when the IC card 215 is deactivated. When the IC card 215 is deactivated, the Control signal from a host computer, such as a personal computer, becomes an 'L' level. When the Control signal becomes an 'L' level, the signal S1 becomes an 'H' level, and the RSTon signal becomes an 'L' level. With the rising edge of signal S1 as a trigger, the first monostable multivibrator 401 outputs an 'H' level signal S2 only for the time period Tw1.

After the period of time Tw1 has elapsed, the first flip-flop 405 detects the trailing edge of signal S2 and outputs an 'L' level. Accordingly, the CLKon signal is inverted from an 'H' level to an 'L' level. When the CLKon signal becomes an 'L' level, the signal S1 at the output of the 2-input Exclusive-OR gate 409 becomes an 'L' level.

At the same time, the second monostable multivibrator 403 detects signal S2 falling to an 'L' level, and outputs an 'H' level signal S3 only for time period Tw2.

After the period of time Tw2 has elapsed, the second flip-flop 407 detects the signal S3 falling to an 'L' level, and outputs an 'L' level. Namely, the signal S4 at the output of the second flip-flop 407 is inverted from an 'H' level to an 'L' level. If signal S4 then becomes an 'L' level, the VCCon signal becomes an 'L' level.

According to the above described operation, the IC card 215 is activated by setting the RSTon signal, CLKon signal and VCCon signals to an 'L' level, in that order.

Finally, the IC card 215 is removed from the IC card reader/writer 207 (the CARDin signal becomes an 'L' level) and processing is ended. If the deactivated IC card 215 is now inserted into the IC card reader/writer 207, the IC card 215 can be activated again.

Modified example 1 of the third embodiment

The present invention is not limited to the circuit of FIG. 17, and various modifications are possible. For example, as shown in the circuit diagram of FIG. 19, the inverted output terminal $\overline{Q}$ of the first monostable multivibrator 401 can be connected to the B terminal of the second monostable multivibrator 403. With this configuration, the second monostable multivibrator 403 outputs an 'H' level on the rising edge of the inverted output of the first monostable multivibrator 401 (signal S6).

Figure 19:
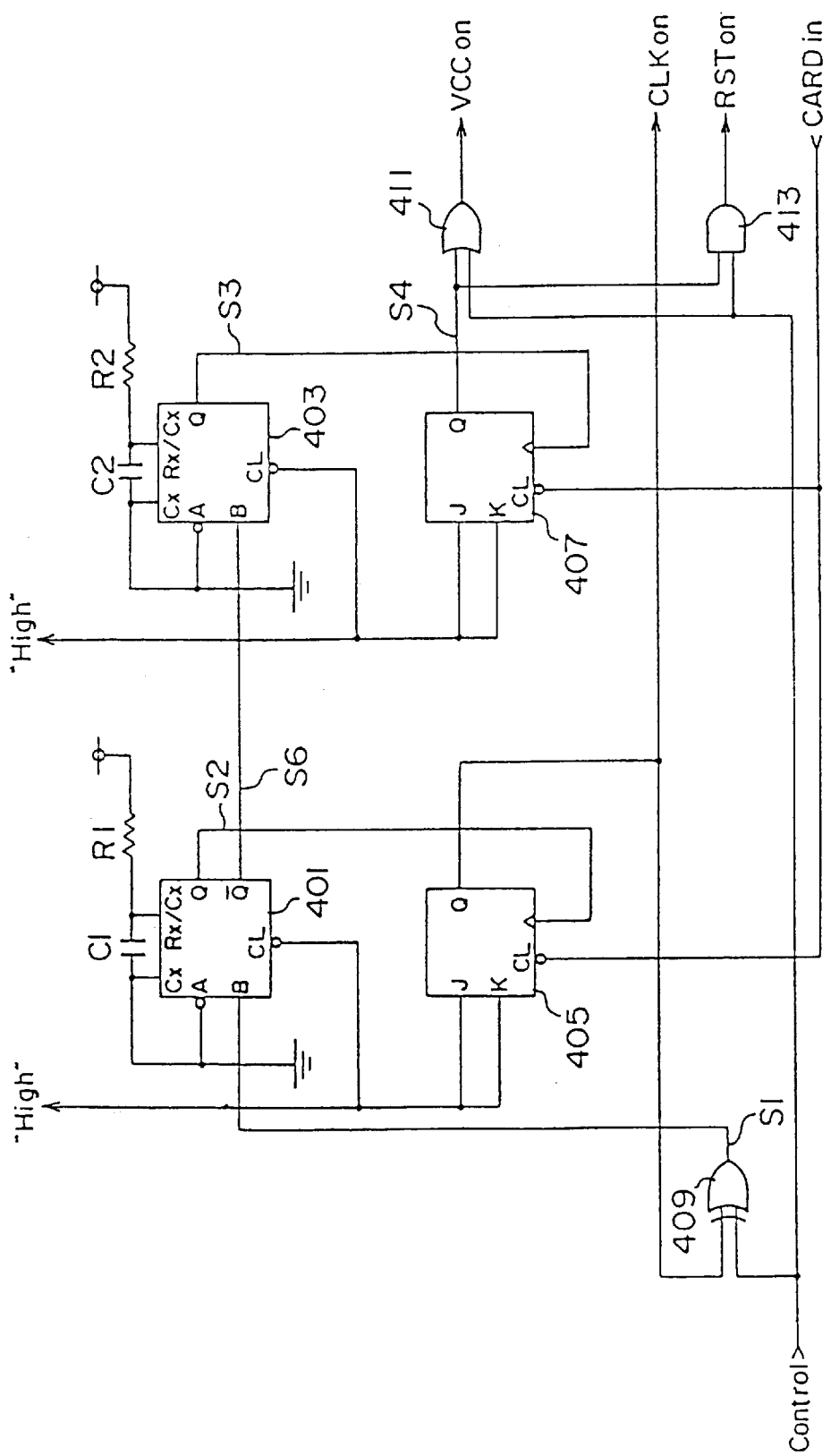
FIG. 19 is a circuit diagram showing modified example 1 of the third embodiment of the present invention.
Figure 20:
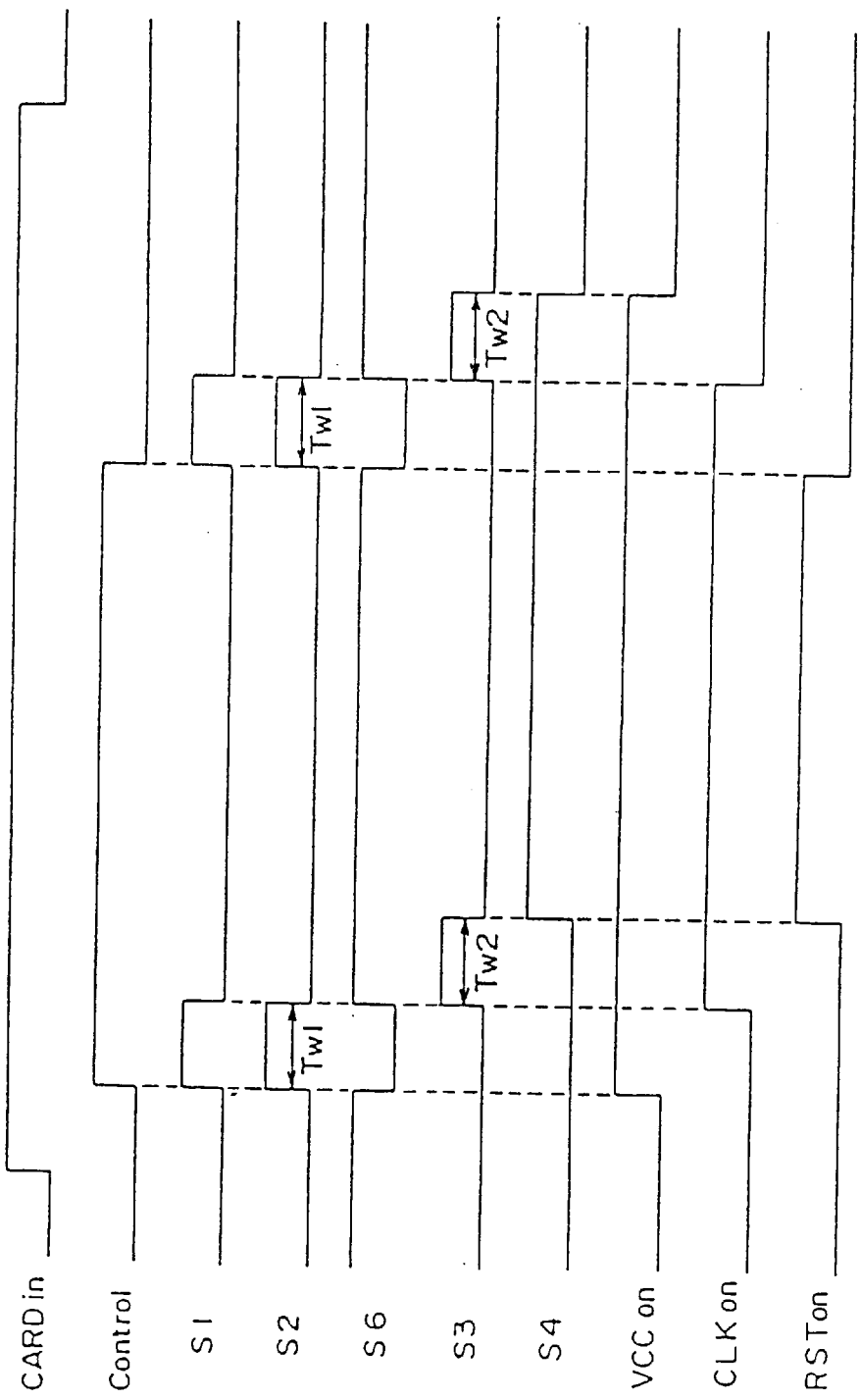
FIG. 20 is a timing chart for describing the operation of the circuit of FIG. 19.

FIG. 20 is a timing chart showing the operation of the circuit shown in FIG. 19. The only difference between this timing chart and the timing chart of FIG. 18 is that the signal S3 at the output of the second monostable multivibrator 403 is output in response to signal S6 at the inverted output of the first monostable multivibrator 401. The remaining operation is the same as for the circuit shown in FIG. 17, and this operation can be easily understood. Therefore, the description of the operation of the circuit shown in FIG. 19 will be omitted.

Modified example 2 of the third embodiment

As has already been described with respect to the third embodiment, the configuration is such that the first monostable multivibrator 401 outputs an 'H' level on the rising edge of signal S1 at the output of the 2-input Exclusive-Or gate 409, but the present invention is not limited to the circuit of FIG. 17, and various modifications are possible. For example, as can be seen in the circuit diagram shown in FIG. 21, a 2-input Exclusive-NOR gate 2109 can be used instead of the 2-input Exclusive-OR gate 409. In this case, the A terminal of the first monostable multivibrator 401 is supplied with the signal S1 at the output of the 2-input Exclusive-NOR gate 2109, and the B terminal is pulled up to an 'H' level. With the above configuration, the signal S2 at the output of the first monostable multivibrator 401 becomes an 'H' level on the trailing edge of the output from the 2-input Exclusive-NOR gate 2109.

Figure 21:
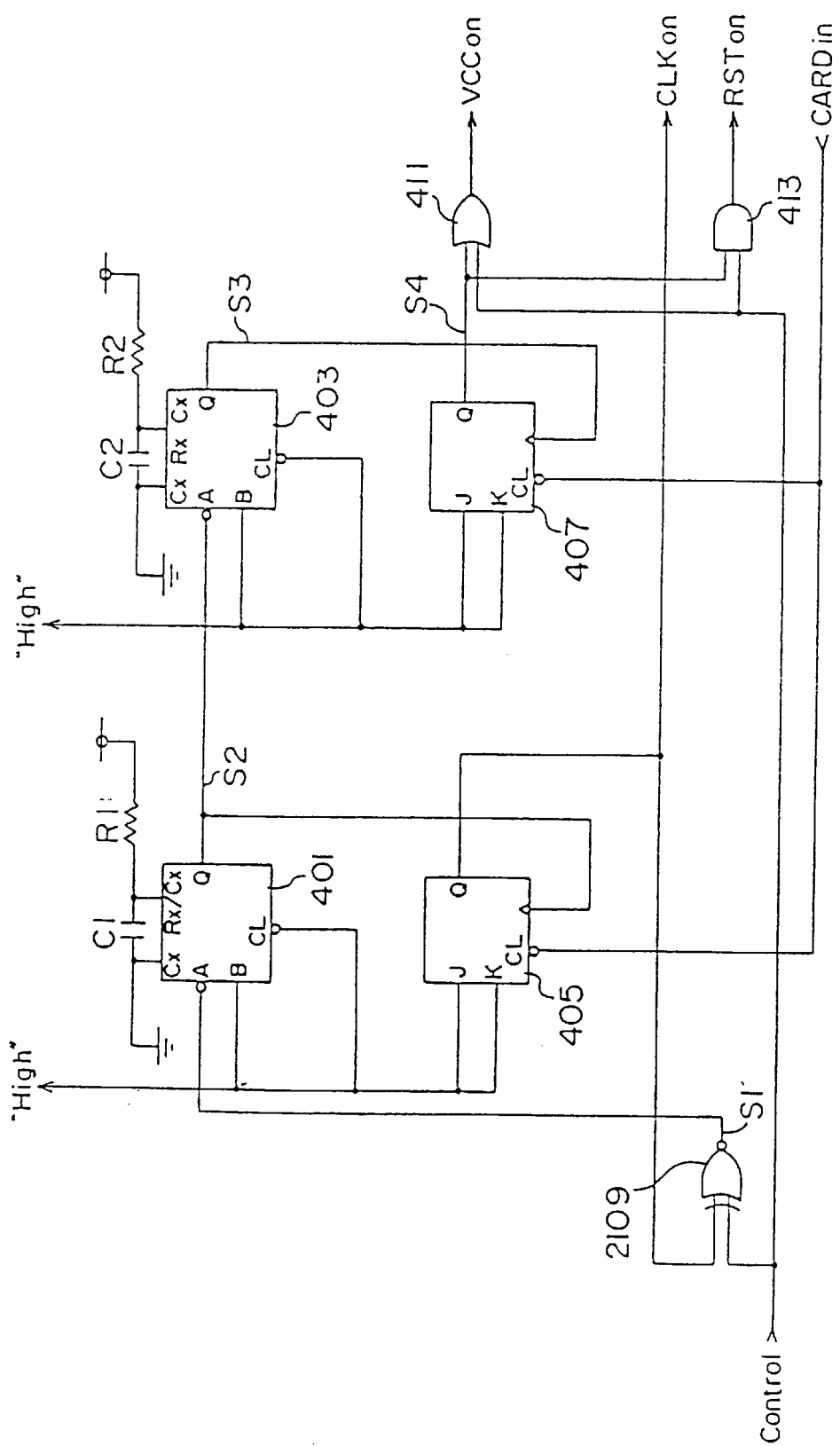
FIG. 21 is a circuit diagram showing modified example 2 of the third embodiment of the present invention.
Figure 22:
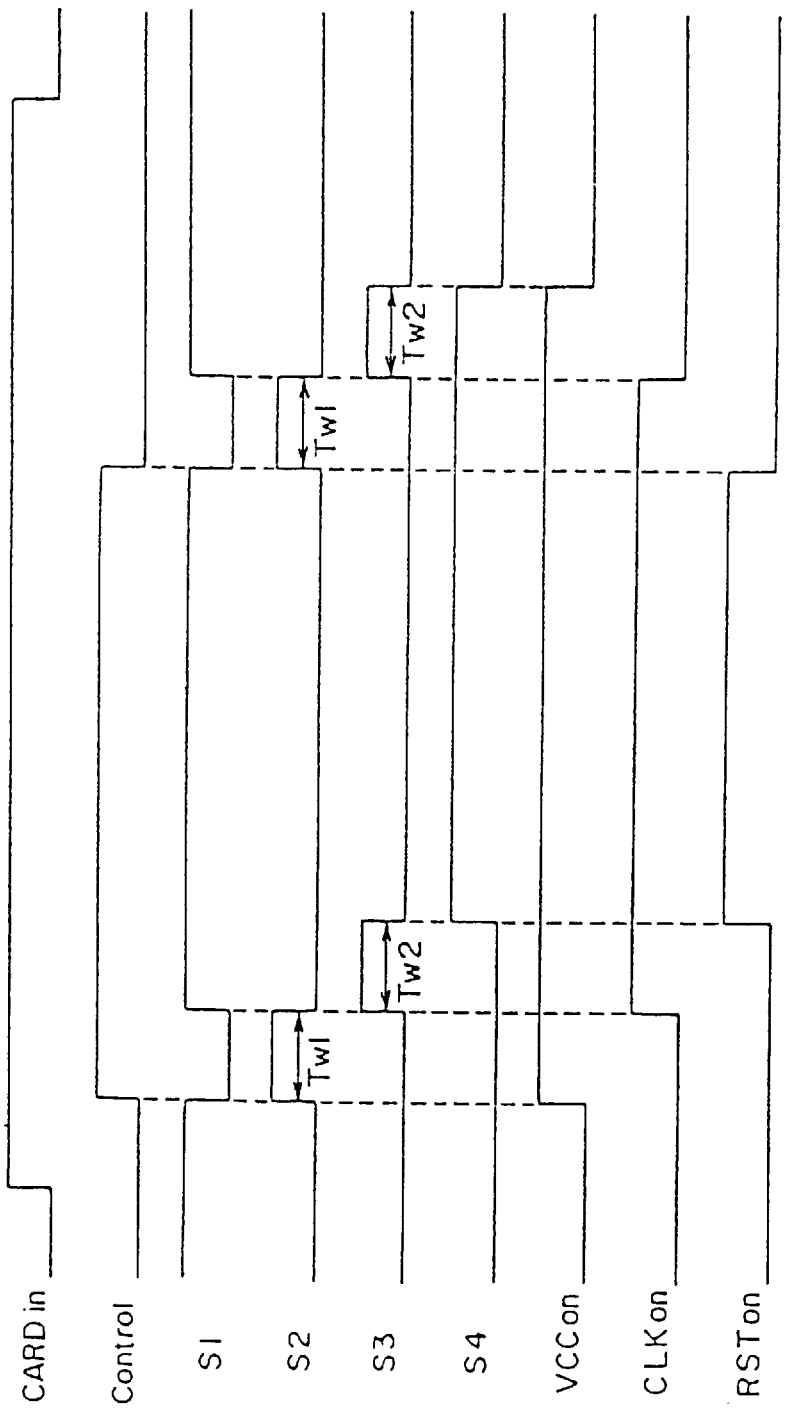
FIG. 22 is a timing chart for describing the operation of the circuit of FIG. 21.

FIG. 22 is a timing chart showing the operation of the circuit shown in FIG. 21. The only difference between this timing chart and the timing chart shown in FIG. 18 of the third embodiment is that the VCCon signal, CLKon signal and RSTon signal are controlled on the falling edge of signal S1. The remaining operation is the same as for the circuit shown in FIG. 17, and can be easily understood. Therefore, description of the operation of the circuit shown in FIG. 21 will be omitted.

Modified example 3 of the third embodiment.

Figure 23:
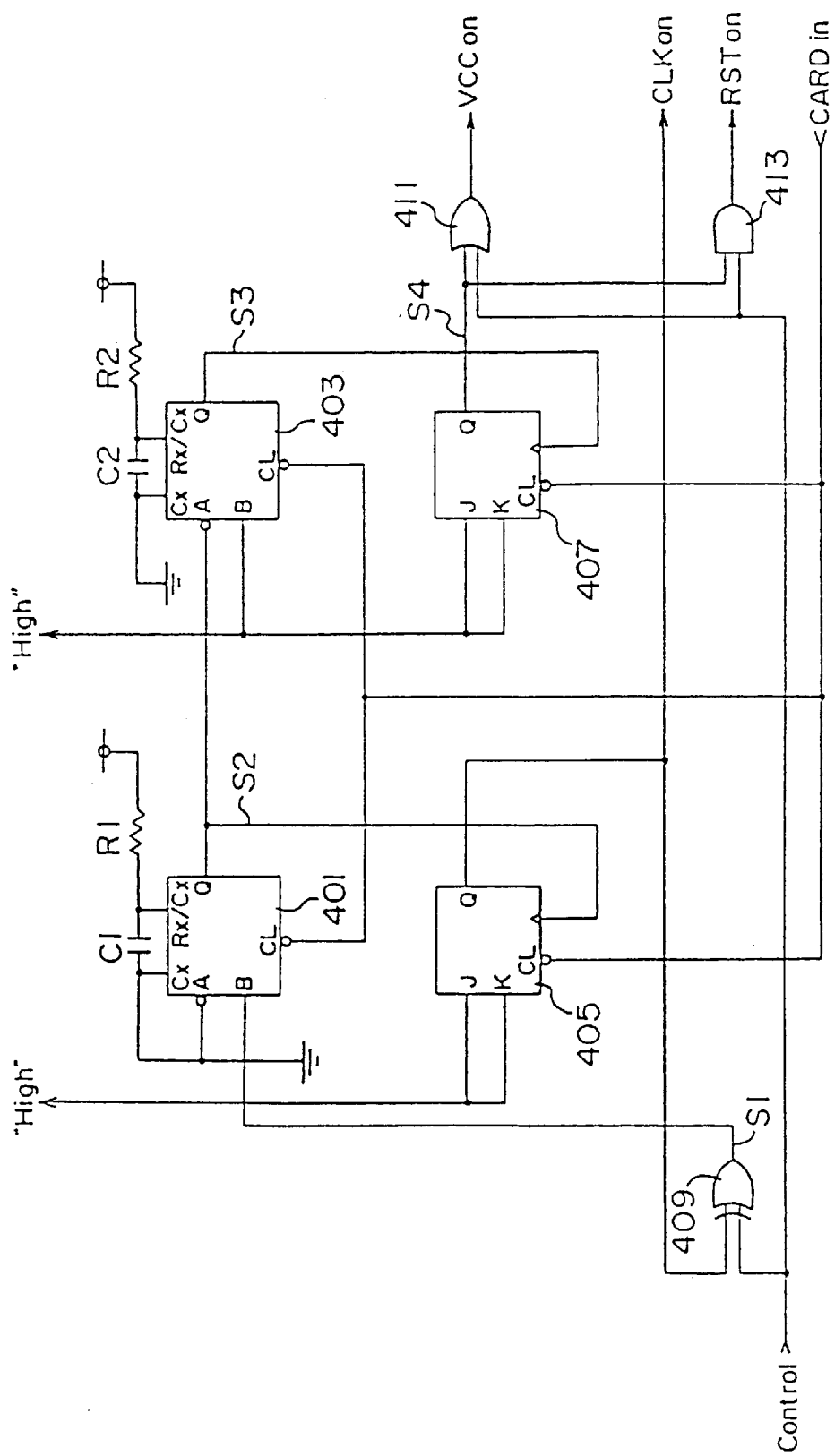
FIG. 23 is a circuit diagram showing modified example 3 of the third embodiment of the present invention.

As shown in the circuit diagram of FIG. 23, the third embodiment of the present invention may have such a configuration that the CARDin signal is input to the clear terminals CL of the first and second monostable multivibrators 401 and 403 and the first and second flip-flops 405, 407. A timing chart showing the operation of the circuit in FIG. 23 is the same as the timing chart shown in FIG. 18, so a description of the operation of the circuit shown in FIG. 23 will be omitted.

Modified example 4 of the third embodiment

Figure 24:
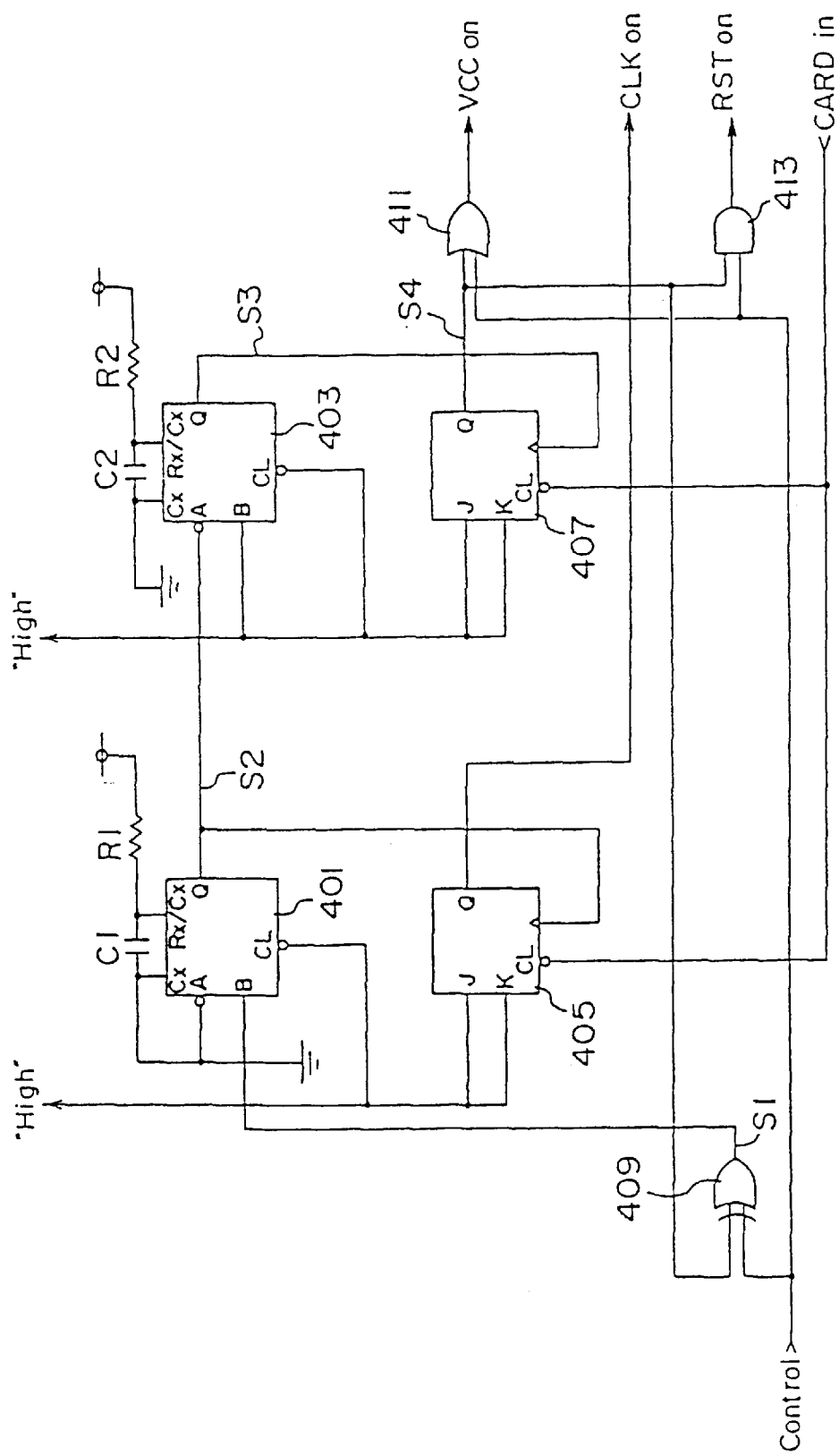
FIG. 24 is a circuit diagram showing modified example 4 of the third embodiment of the present invention.
Figure 25:
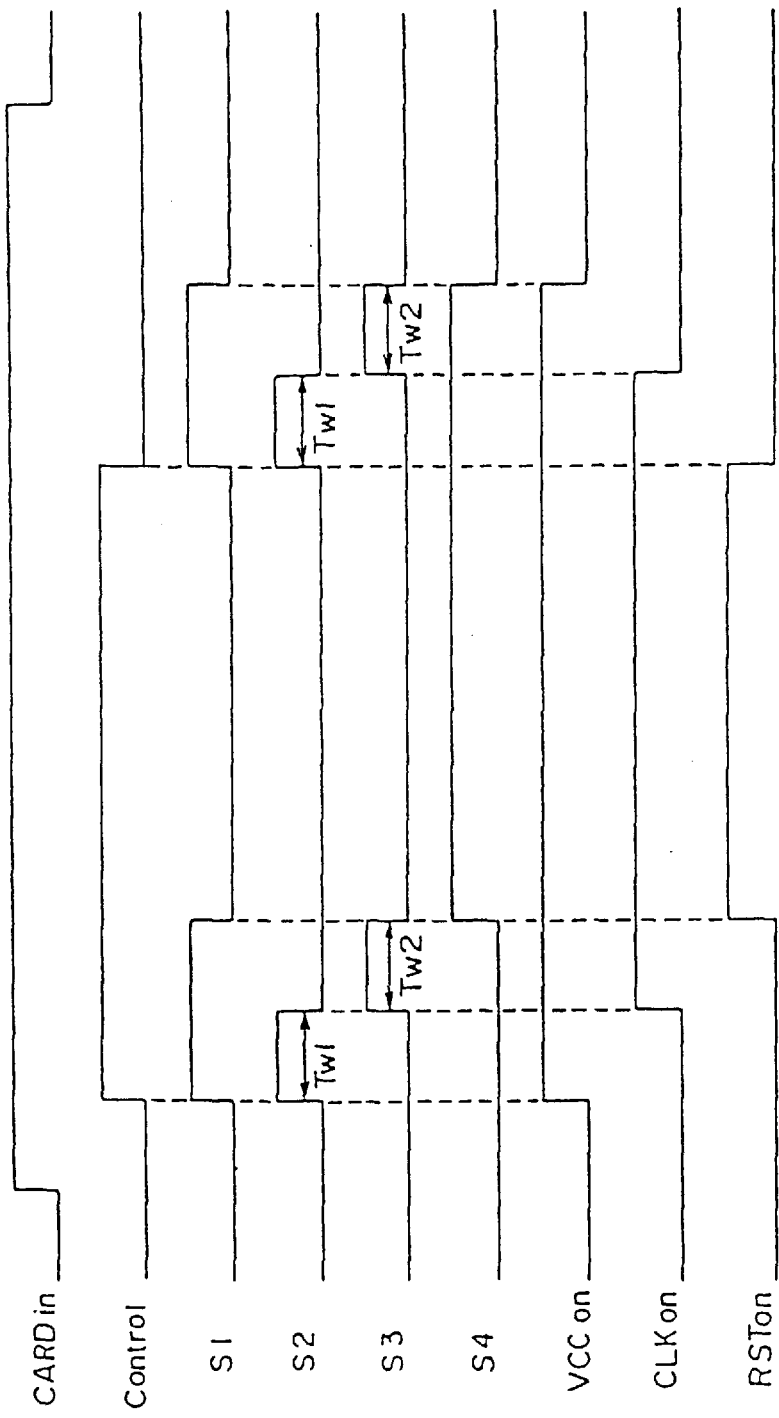
FIG. 25 is a timing chart for describing the operation of the circuit of FIG. 24.

As shown in the circuit diagram of FIG. 24, in the third embodiment of the present invention, signal S4 may be input to the second input terminal of the 2-input Exclusive-OR gate 409, instead of the CLKon signal. The timing chart for this circuit is shown in FIG. 25.

Modified example 5 of the third embodiment

Figure 26:
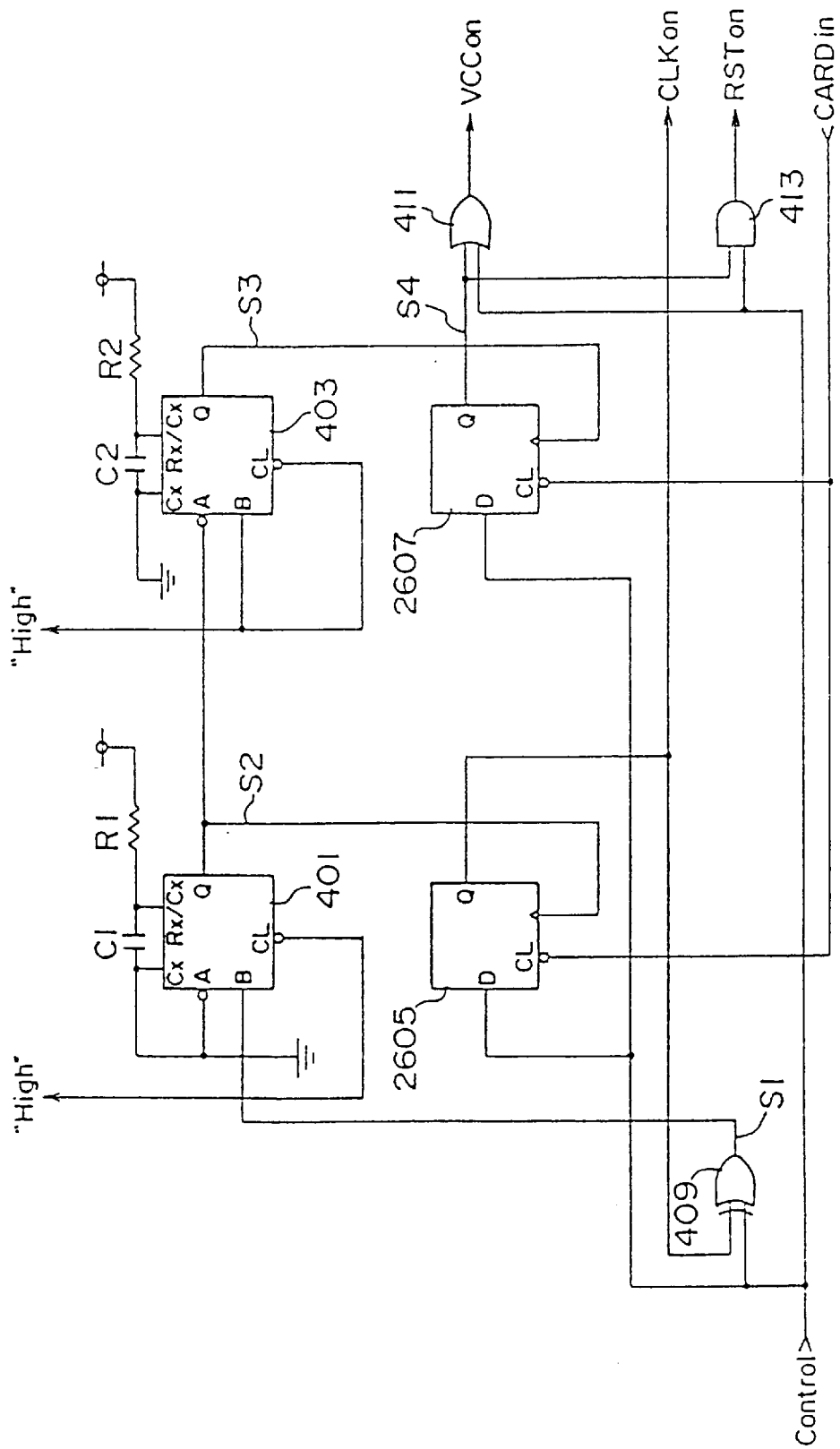
FIG. 26 is a circuit diagram showing modified example 5 of the third embodiment of the present invention.

As shown in the circuit diagram of FIG. 26, the third embodiment of the present invention may use falling edge triggered D-type flip-flops 2605 and 2607 in place of the first and second flip-flops 405 and 407, which are J-K flip-flops. In this case, the Control signal is supplied to the data terminals D of the D flip-flops 2605 and 2607. A timing chart for the circuit of FIG. 26 is the same as the timing chart in FIG. 18, so the description thereof will be omitted.

Modified example 6 of the third embodiment

Figure 27:
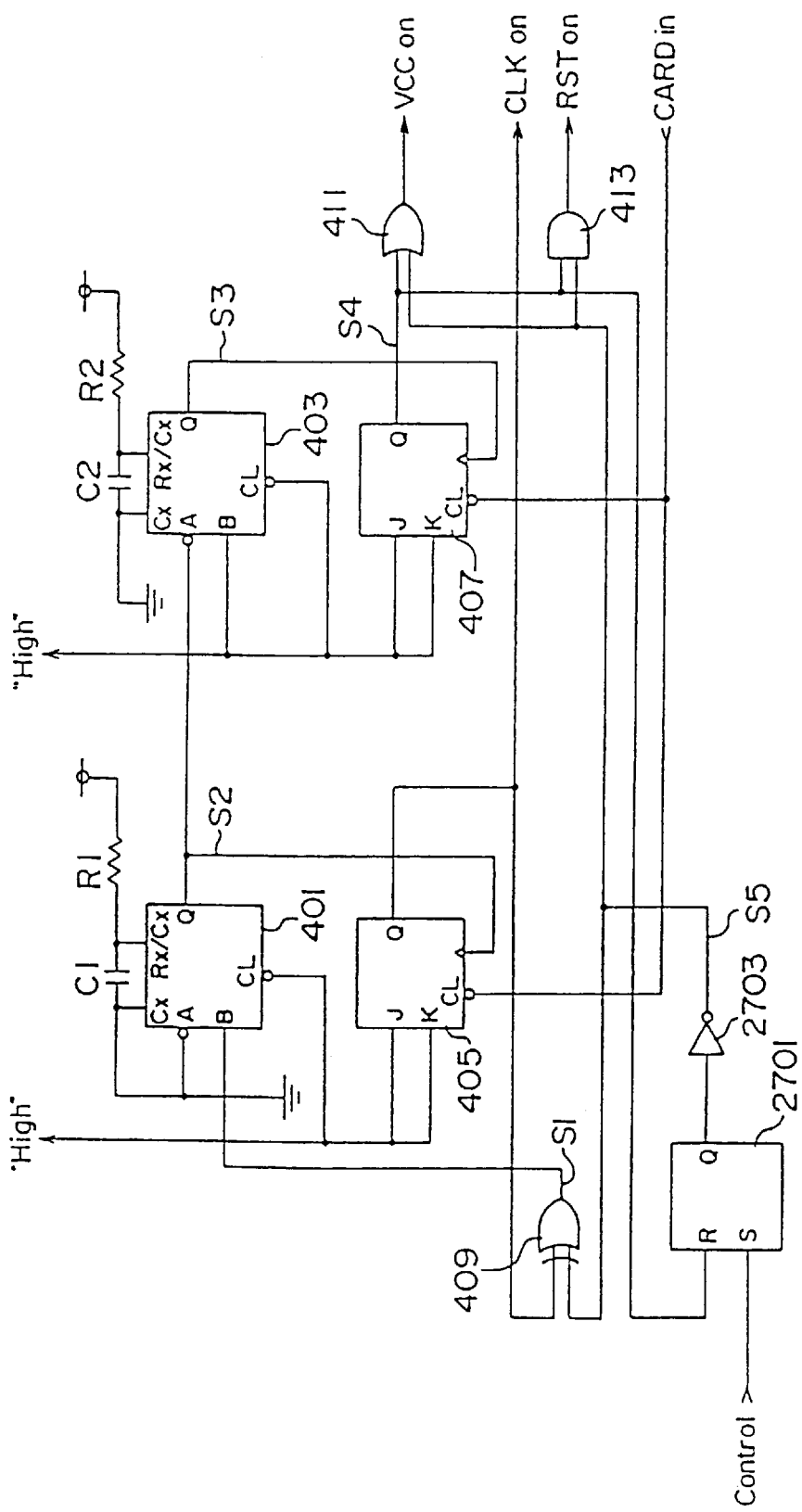
FIG. 27 is a circuit diagram showing modified example 6 of the third embodiment of the present invention.
Figure 28:
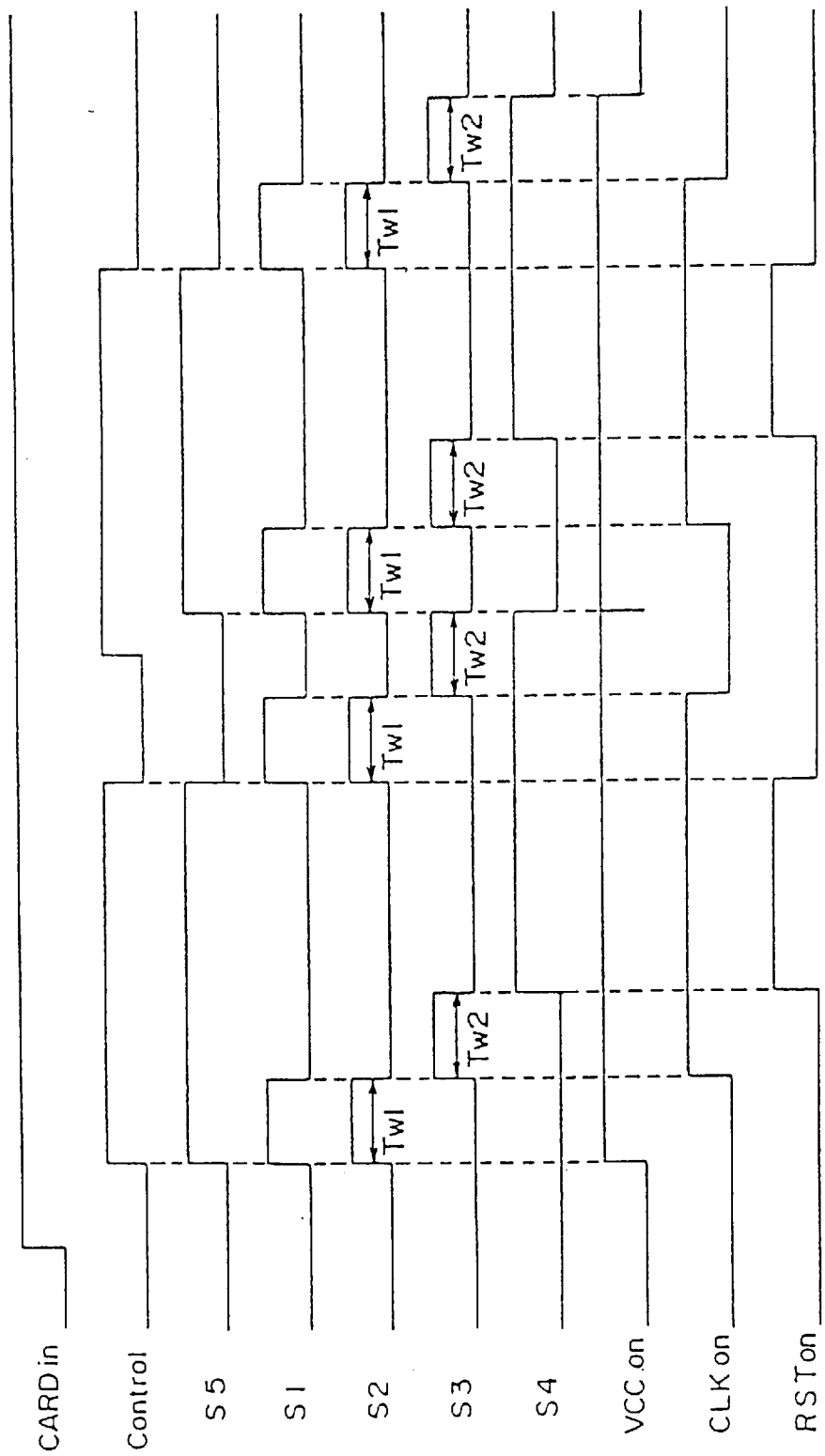
FIG. 28 is a timing chart for describing the operation of the circuit of FIG. 27.

As shown in the circuit diagram FIG. 27, it is possible for the third embodiment of the present invention to carry out the same conversion as explained in connection with embodiment 2. That is, an RS latch 2701 and an inverter 2703 are provided, and the output of the inverter 2703 (signal S5) is used instead of the Control signal. The timing chart in FIG. 28 for the circuit shown in FIG. 27 can be easily understood from the modified example 3 of the second embodiment, and so description will be omitted.

As has been described in detail above, according to the third embodiment of the present invention, and the modified examples thereof, the second monostable multivibrator 403 is operated with the output of the first monostable multivibrator 401 as a trigger. There is therefore no turning around of the delay generating sequence, even if the values of the resistors and capacitors connected to the first and second monostable multivibrators 401, 403 vary greatly, and the effect of being able to construct a circuit which is not influenced by temperature variations or voltage variations can be expected.

Fourth Embodiment

In the first to third embodiments of the present invention, the time delays are generated using time constants set by CR circuits, but if the clock CLK supplied to the IC card 215 is altered, not only the oscillator 211 (Crystal oscillator) but also the resistors and capacitors must be changed. Further, because the delay times described above are fixed, particularly if a number of crystal oscillators of varying frequency are used as the oscillator 211 for supplying the clock CLK to the IC card 215, the delay time must be set so that the time needed for 40,000 clock cycles of one of the plurality of clocks matches with the frequency of the longest clock CLK. Accordingly, if the setting of the delay time matches one of the clocks CLK, there is a problem that processing becomes slow when the other clock for which the time required for 40,000 clock cycles is,short is used.

Figure 29:
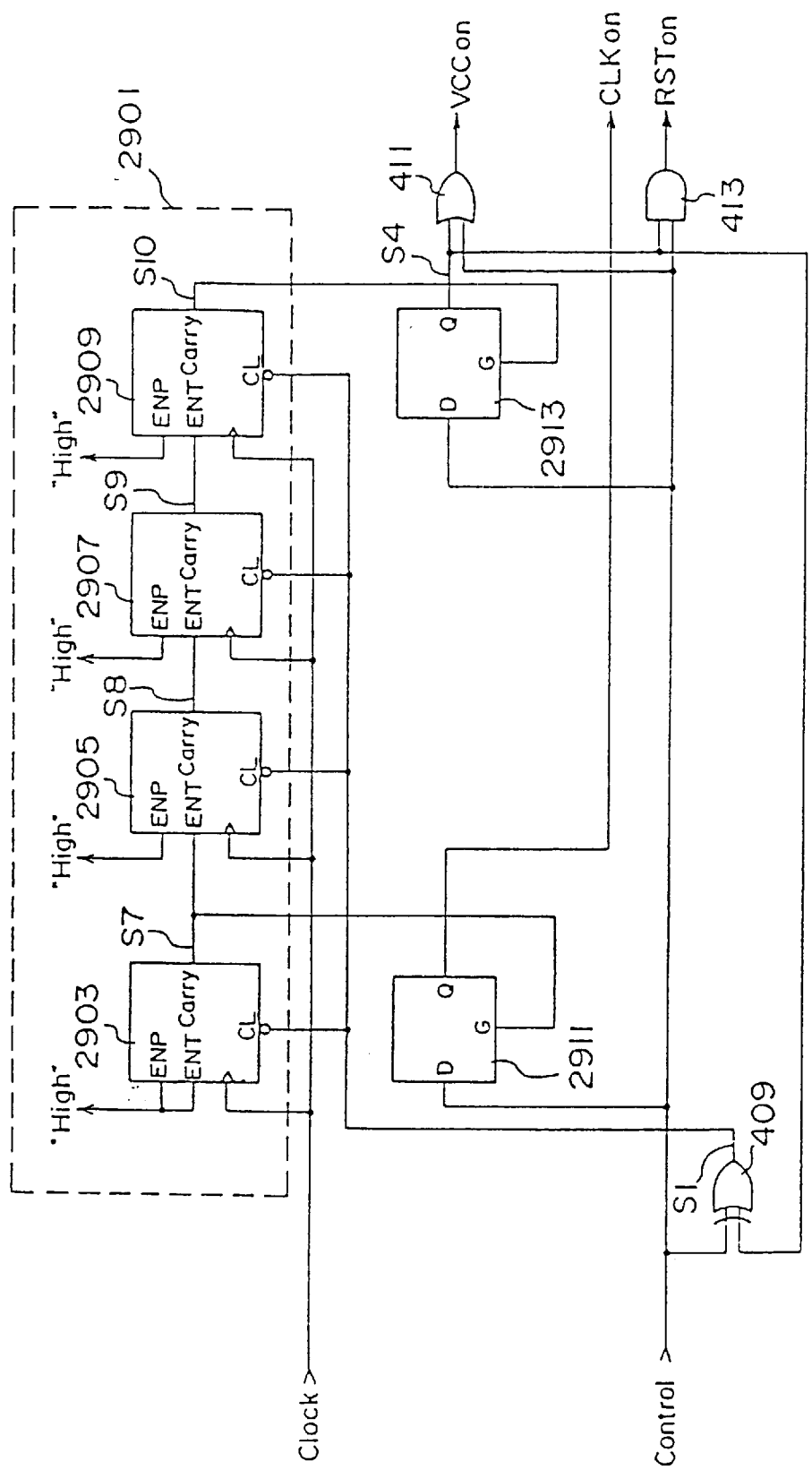
FIG. 29 is a block diagram of a fourth embodiment of the present invention.

The circuit shown in FIG. 29 has been proposed to improve the above mentioned problem.

FIG. 29 is a circuit diagram of a fourth embodiment of the present invention.

As shown in FIG. 29, the fourth embodiment of the present invention uses a 4-bit binary counter 2901 (hereinafter simply called a counter) as delay generating means. With this configuration, even in the case where a number of clocks CLK of varying frequency are used, a delay time corresponding to each clock CLK can be provided.

The fourth embodiment of the present invention will be explained below based on FIG. 29. The block diagram for the circuit shown in FIG. 29 is the same as for FIG. 1.

The differences between the fourth embodiment and the first to third embodiments of the present invention are the counter 2901 comprising the counters 2903 to 2909, the D-type latch 2911, and the D-type latch 2913.

A Control signal is supplied to one input terminal of a 2-input Exclusive-Or gate 409, and the output of D-type latch 2913 is supplied to the other input terminal. Signal S1 is output from the output terminal of the 2-input Exclusive-OR gate 409, and this signal S1 is supplied to the CL terminals of the first to fourth counters 2903~2909.

A clock supplied to the IC card 215 is supplied in common to the CLK terminals of the first to fourth counters 2903~2909. The Enable P terminals (hereinafter simply called ENP) of the first to fourth counters 2903~2909 are pulled-up together. The Carry signal of the first counter 2903 is supplied to the G terminal of the D-type latch 2911, and is also supplied to the Enable T terminal (hereinafter simply called ENT) of the second counter 2905.

The Carry signal of the second counter 2905 is supplied to the ENT terminal of the third counter 2907. Similarly, the Carry signal of the third counter 2907 is supplied to the ENT terminal of the fourth counter 2909.

The carry signal of the fourth counter 2909 is supplied to the G terminal of the D-type latch 2913.

The Control signal is commonly supplied to the D terminal of the D-type latch 2911, the D terminal of the D-type latch 2913, one input terminal of the 2-input Or gate 411 and one input terminal of 2-input AND gate 413.

The output of the D-type latch 2913 is commonly supplied to the other input terminal of the 2-input OR gate 411 and the other input terminal of the 2-input AND gate 413. The output of this 2-input OR gate 411 is used as the VCCon signal, the output of the D-type latch 2911 is used as the CLKon signal, and the output of the 2-input AND gate 413 is used as the RSTon signal.

Next, the operation of the fourth embodiment of the present invention will be described.

First of all, the operation when the IC card 215 is activated will be described. The IC card 215 is inserted into the IC card reader/writer 207. Next, when the Control signal becomes an 'H' level, the output of the 2-input Exclusive-OR gate 409 (signal S1) also becomes an 'H' level. The VCCon signal also becomes an 'H' level. When the signal S1 becomes an 'H' level, the first to fourth counters 2903~2909 enter an operating state, and the count operation starts.

When 16 clock pulses are input to the first counter 2903, an 'H' level signal S7 is output. This signal S7 falls to an 'L' level when the next clock pulse is input. When the signal S7 becomes an 'H' level, the D-type latch 2911 latches an 'H' level Control signal. Accordingly, the CLKon signal becomes an 'H' level.

On the other hand, the second counter 2905 increments the count value by one in response to a clock pulse when the signal S7 becomes an 'H' level.

When the second counter 2905 has counted the 'H' level of signal S7 16 times, it outputs an 'H' level signal S8. This signal S8 falls to an 'L' level when the next clock pulse is input. When signal S8 becomes an 'H' level, the third counter 2907 increments the count value by one in response to a clock pulse.

When the third counter 2907 has counted the 'H' level of signal S8 16 times, it outputs an 'H' level signal S9. This signal S9 falls to an 'L' level when the next clock pulse is input. When signal S9 becomes an 'H' level, the fourth counter 2909 increments the count value by one in response to a clock pulse.

When the fourth counter 2909 has counted the 'H' level of signal S9 16 times, it outputs an 'H' level signal S10. This signal S10 falls to an 'L' level when the next clock pulse is input. When signal S10 becomes an 'H' level, the D-type latch 2913 latches an 'H' level Control signal. Accordingly, signal S4 becomes an 'H' level.

When signal S4 becomes an 'H' level, the RSTon signal becomes an 'H' level. At the same time, the signal S1 becomes an 'L' level, and the count operation of the counter 2901 is suspended.

According to the above described operation, the IC card 215 is activated by setting the RSTon signal, CLKon signal and VCCon signals to an 'H' level, in that order.

Next, the operation when the IC card is deactivated will be described.

When the IC card is deactivated, first of all the Control signal becomes an 'L' level. When the Control signal becomes an 'L' level, the signal S1 becomes an 'H' level and also the RSTon signal becomes an 'L' level. Further, when the signal S1 becomes an 'H' level, the counter 2901 is put back into the operating state and the count operation starts.

When 16 clock pulses are input to the first counter 2903, an 'H' level signal S7 is output. This signal S7 falls to an 'L' level when the next clock pulse is input. When the signal S7 becomes an 'H' level, the D-type latch 2911 latches an 'L' level Control signal. Accordingly, the CLKon signal becomes an 'L' level.

The second counter 2905 increments the count value by one in response to a clock pulse when the signal S7 becomes an 'H' level.

When the second counter 2905 has counted the 'H' level of signal S7 16 times, it outputs an 'H' level signal S8. This signal S8 falls to an 'L' level when the next clock pulse is input. When signal S8 becomes an 'H' level, the third counter 2907 increments the count value by one in response to a clock pulse.

When the third counter 2907 has counted the 'H' level of signal S8 16 times, it outputs an 'H' level signal S9. This signal S9 falls to an 'L' level when the next clock pulse is input. When signal S9 becomes an 'H' level, the fourth counter 2909 increments the count value by one in response to a clock pulse.

When the fourth counter 2909 has counted the 'H' level of signal S9 16 times, it outputs an 'H' level signal S10. This signal S10 falls to an 'L' level when the next clock pulse is input.

When signal S10 becomes an 'H' level, the D-type latch 2913 latches an 'L' level Control signal. Accordingly, signal S4 becomes an 'L' level.

When signal S4 becomes an 'L' level, the VCCon signal becomes an 'L' level. At the same time, the signal S1 becomes an 'L' level, and the count operation of the counter 2901 is suspended.

According to the above described operation, the IC card 215 is Deactivated by setting the RSTon signal, CLKon signal and VCCon signals to an 'L' level, in that order.

Finally, the IC card 215 is removed from the IC card reader/writer 207 (the CARDin signal becomes an 'L' level) and processing is completed. If the deactivated IC card 215 is inserted into the IC card reader/writer 207, it can be activated again.

Modified example 1 of the fourth embodiment

The present invention is not limited to the circuit of FIG. 29, and various modifications are possible. For example, as can be seen from the circuit diagram of FIG. 30, it is possible to supply the signal S7 (Carry signal) at the output of the first counter 2903 to the ENP and ENT terminals of the second to fourth counters 2905~2909.

As a result of this configuration, with a plurality of counters in a cascade connection, the effect of the delay arising for the clock pulses can be made that of only the first stage counter. Accordingly, this embodiment is effective when there is a need for a higher speed clock.

The operation of this embodiment is almost the same as that of the circuit of FIG. 29, so explanation thereof will be omitted.

Modified example 2 of the fourth embodiment

Figure 30:
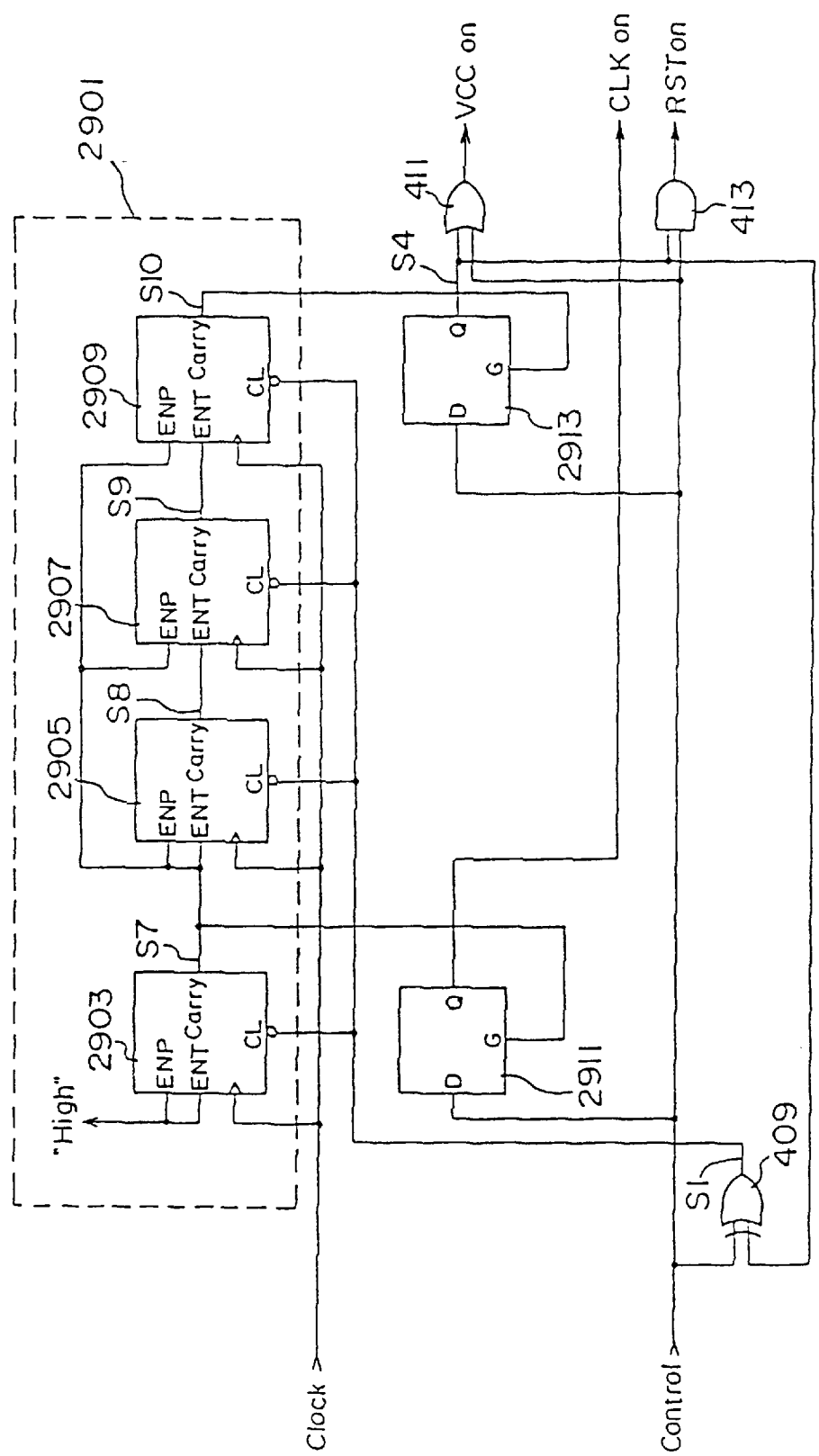
FIG. 30 is a circuit diagram showing modified example 1 of the fourth embodiment of the present invention.
Figure 31:
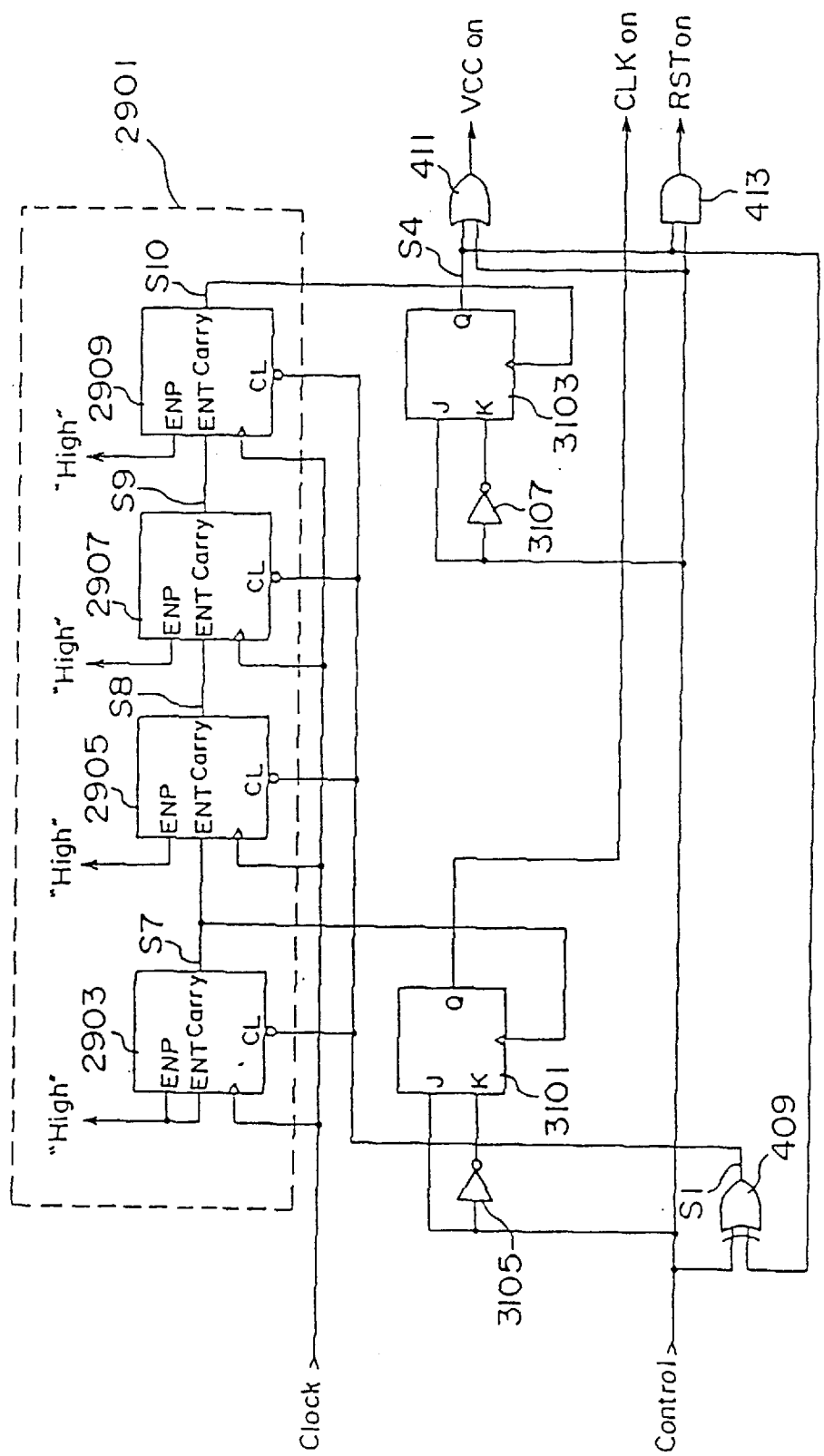
FIG. 31 is a circuit diagram showing modified example 2 of the fourth embodiment of the present invention.

As shown in FIG. 31, the present invention may use JK flip-flops 3101 and 3103 in place of the D-type latches 2911 and 2913 in modified example 1 of the fourth embodiment shown in FIG. 30. In this case, each J terminal is supplied with the Control signal, and each K terminal is supplied with an inverted Control signal via the inverters 3105 and 3107. The JK flip-flops 3101 and 3103 then operate on the trailing edges of the Carry signals.

It is also possible to use falling edge triggered D-type flip-flops in place of the JK flip-flops 3101 and 3103.

Apart from the fact that each of the signals RSTon, CLKon and VCCon is controlled in synchronization with the trailing edges of Signal S7 and signal S10, the operation of this embodiment is the same as that of the circuit shown in FIG. 30, so explanation thereof will be omitted.

Modified example 3 of the fourth embodiment

Figure 32:
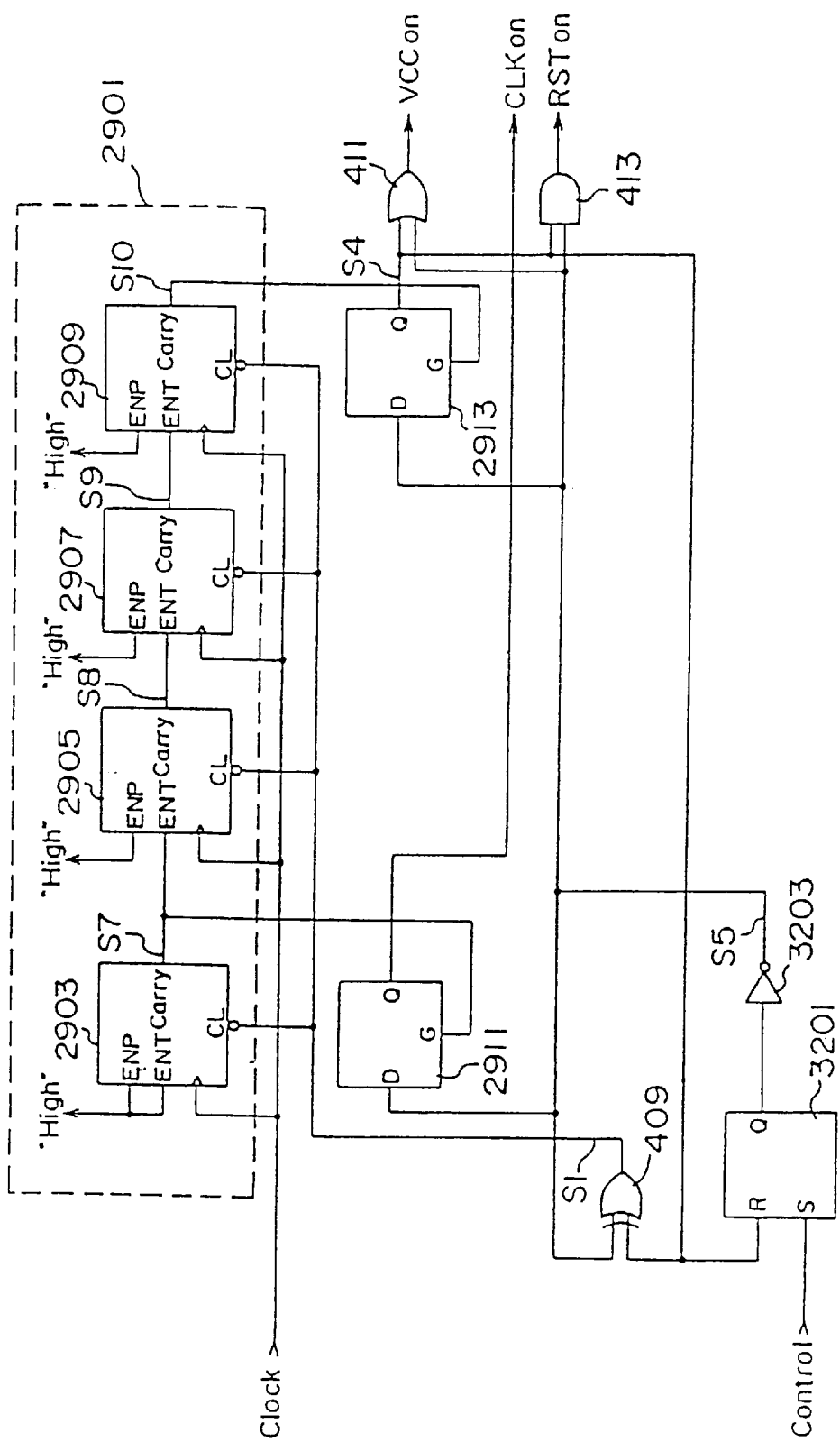
FIG. 32 is a circuit diagram showing modified example 3 of the fourth embodiment of the present invention.

Further, as shown in FIG. 32, it is possible to carry out the same modification as was described in the second embodiment of the present invention. Namely, as can be seen in FIG. 32, this embodiment has an RS latch 3201 and an inverter 3203 added to the circuit shown in FIG. 30. The RS latch 3201 has a set terminal S supplied with the Control signal, a reset terminal R connected to the output terminal Q of the D-type latch 2913, and an output terminal Q. The inverter 3203 is connected between the output terminal Q of the RS latch and the 2-input Exclusive-OR gate 409.

That is, the output from the inverter 3203 (signal S5) is used in place of the Control signal in the circuit shown in FIG. 30.

The operation and effect of this embodiment can be easily understood from the second embodiment of the present invention, so explanation thereof will be omitted.

Further, although not illustrated, in the above described fourth embodiment, and the modified examples, it is possible to have a configuration where a 2-input AND gate is provided, the AND gate receiving the output from the 2-input Exclusive OR gate 409 and the CARDin signal as inputs, and the output of the AND gate being connected to the CL terminals of the first to fourth counters 2903~2909, so that the counters do not carry out any operation when the IC card 215 is not inserted in the IC card reader/writer 207.

As described above, according to the fourth embodiment and modified examples thereof, it is possible to comply with the IC card activation/deactivation sequence defined in the ISO standard without building in a CPU, even when there is only one Control signal from a host, such as a personal computer (when there is only one control line). Consequently, since firmware development costs and expensive components, such as a CPU and memory, are not necessary, it is possible to curb the manufacturing cost of an IC card control circuit and IC card control system.

The standard logic ICs are small in size compared to a CPU or memory, etc., which means that they will be useful when even more miniaturized IC card reader/writers (IC card control circuit and IC card control system) are required, for example, when including an IC card reader/writer (IC card control circuit and IC card control system) in devices having small internal spaces, such as notebook type personal computers, etc.

Further, there is the effect that the frequency of the clock to be supplied to the IC card can be modified by simply changing the clock generating means (for example, a crystal oscillator), that is, without changing any other components.

Still further, even when a number of clock generating means having varying frequencies are housed within the IC card reader/writer, a delay time can be provided complying with each clock.

Fifth Embodiment

Figure 33:
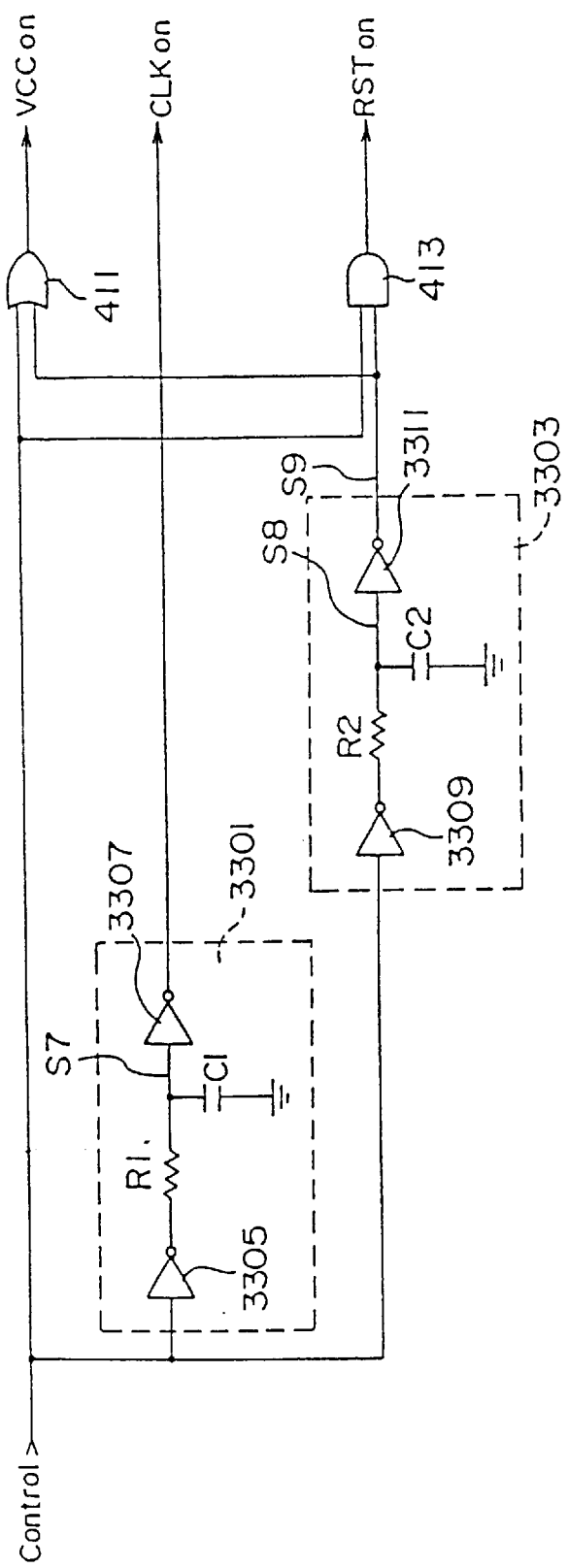
FIG. 33 is a block diagram of a fifth embodiment of the present invention.

In the above described first to fourth embodiments, explanation has been given of four examples using monostable multivibrators, flip-flops, counters, etc. as delay generating means, but the present invention can also use a first delay generating circuit 3301 and a second delay generating circuit 3303 as the delay generating means, as shown in FIG. 33.

The first delay generating circuit 3301 is composed of an inverter 3305 (a Schmitt trigger inverter may also be used), an inverter 3307 (a Schmitt trigger inverter may also be used), a resistor R1 and a capacitor C1. The input terminal of the inverter 3305 at the input of this first delay means 3301 is supplied with the Control signal, and a CLKon signal is output from the output terminal of the inverter 3307 at the output of the first delay generating means 3301

The second delay generating circuit 3303 is composed of an inverter 3309 (a Schmitt trigger inverter may also be used), an inverter 3311 (a Schmitt trigger inverter may also be used), a resistor R2 and a capacitor C2. The input terminal of the inverter 3309 at the input of this second delay means 3303 is supplied with the Control signal, and the output terminal of the inverter 3311 at the output of the second delay generating means 3303 is connected to an input terminal of a 2-input AND gate 413 and an input terminal of a 2-input OR gate 411.

Namely, in the circuit of FIG. 33, each of the signals RSTon, CLKon and VCCon is generated from the direct delay of the Control signal using CR time constants determined by the capacitors and resistors.

Figure 34:
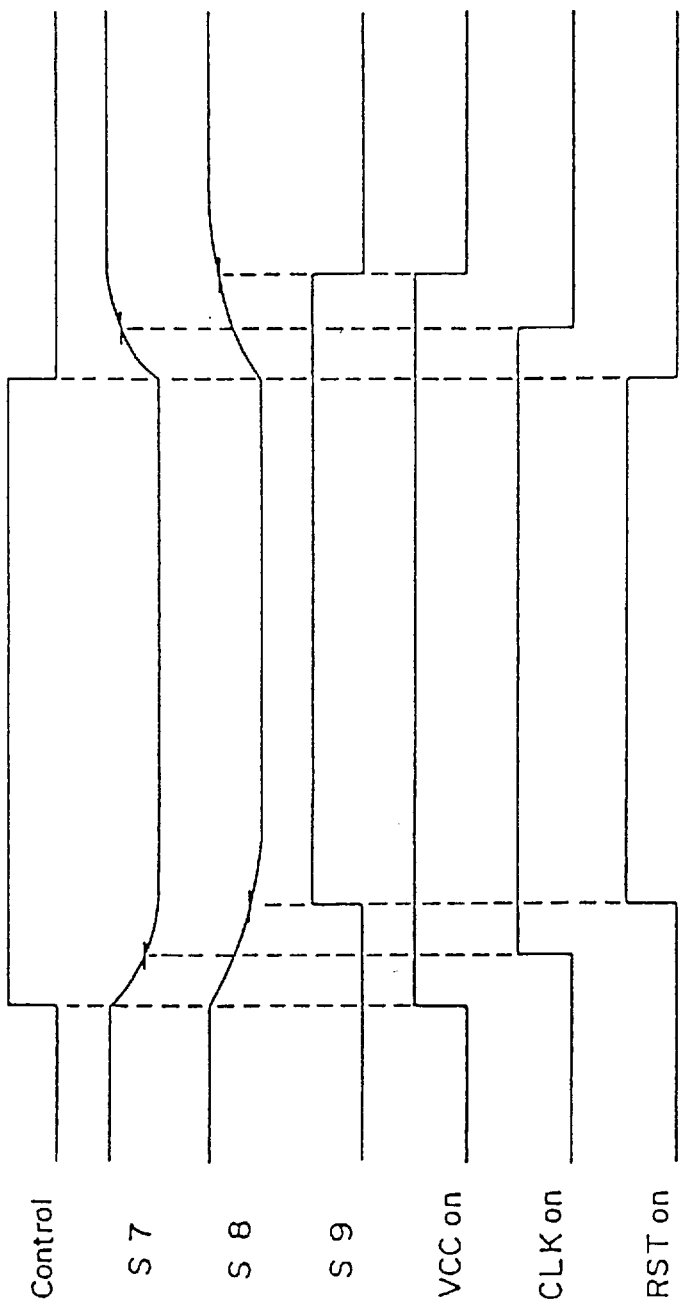
FIG. 34 is a timing chart for describing the operation of the circuit of FIG. 33.

Next, the operation of the circuit shown in FIG. 33 will be explained based on the timing chart of FIG. 34. In the explanation below, the circuit of FIG. 34 is incorporated into an IC card reader/writer.

First, the operation when the card is activated will be explained.

The IC card 215 is inserted into the IC card reader/writer 207. Next, the Control from the host, such as a personal computer, is changed from an 'L' level to an 'H' level. When the Control signal becomes an 'H' level, the VCCon signal becomes an 'H' level. Also, the output of the inverter 3305 of the first delay generating circuit 3301 (signal S7) gradually becomes an 'L' level from an 'H' level, because of the resistor R1 and capacitor C1. Similarly, the output of the inverter 3309 of the second delay generating circuit 3303 (signal S8) gradually becomes an 'L' level from an 'H' level, because of the resistor R2 and capacitor C2.

Next, when signal S7 is settled at the 'L' level, the output of the inverter 3307 of the first delay generating circuit 3301 (CLKon signal) becomes an 'H' level from an 'L' level.

After that, when signal S8 has settled at the 'L' level, the output of the inverter 3311 of the second delay generating circuit 3303 (signal S9) changes from an 'L' level to an 'H' level.

When signal S9 becomes an 'H' level, the RSTon signal becomes an 'H' level and the IC card 215 is activated.

Next, the operation when the IC card 215 is deactivated will be explained. When the IC card 215 is to be deactivated, the Control signal from the host, such as a personal computer, is set to an 'L' level. When the Control signal becomes an 'L' level, the RSTon signal becomes an 'L' level. Also, when the Control signal becomes an 'L' level, the signal S7 gradually changes from an 'L' level to an 'H' level, because of the resistor R1 and capacitor C1. Similarly, when the Control signal becomes an 'L' level, the signal S8 gradually changes from the 'L' level to an 'H' level, because of resistor R2 and capacitor C2.

When the signal S7 has settled at the 'H' level, the CLKon signal becomes an 'L' level. After that, when the signal S8 has settled at the 'H' level, the VCCon signal becomes an 'L' level and the IC card 215 is deactivated.

Although not illustrated, it is also possible to modify this embodiment in a similar manner to that described in the second embodiment of the present invention. That is, in the present invention, it is also possible to add an RS latch and an inverter to the circuit shown in FIG. 33.

In that case, the Control signal is supplied to the set terminal S of the RS latch, the output of the second delay generating circuit 3303 is supplied to the reset terminal R of the RS latch, and an inverted signal of the output from the output terminal Q of the RS latch is used as the Control signal.

That is, the inversion of the RS latch output (the output of the inverter) is used in place of the Control signal shown in the circuit of FIG. 33.

According to the fifth embodiment of the present invention, each of the RSTon signal, CLKon signal and VCCon signal are generated according to the Control signal and the CR circuits having an extraordinarily simple configuration (the first and second delay generating circuits). Accordingly, because the cost can be reduced, this embodiment is particularly effective where cost is more important than function.

Modified Example of the fifth embodiment.

Figure 35:
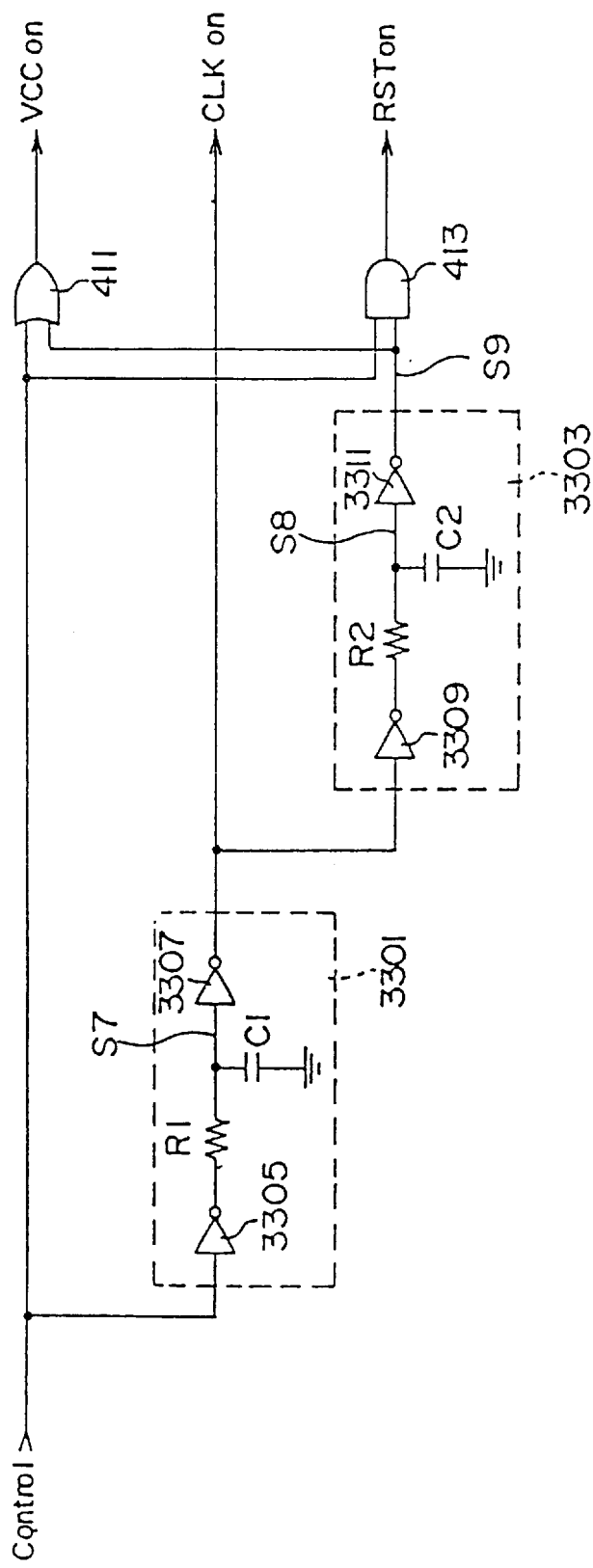
FIG. 35 is a circuit diagram of a modified example of the fifth embodiment of the present example.

As a modified example of the fifth embodiment, it can be considered to replace the circuit of FIG. 33 with a circuit such as that shown in FIG. 35. FIG. 35 shows a modified example of the fifth embodiment of the present invention, and the same reference numerals as in the same composition of FIG. 33 are used.

The first delay generating circuit 3301 is composed of an inverter 3305 (a Schmitt trigger inverter may also be used), an inverter 3307 (a Schmitt trigger inverter may also be used), a resistor R1 and a capacitor C1. The input terminal of the inverter 3305 at the input of the first delay generating means 3301 is provided with the Control signal, and the CLKon signal is output from the output terminal of the inverter 3307 at the output of the first delay generating circuit 3301. The output of the inverter 3307 is also applied to a second delay generating circuit 3303 which will be mentioned later.

The second delay generating circuit 3303 is composed of an inverter 3309 (a Schmitt trigger inverter may also be used), an inverter 3311 (a Schmitt trigger inverter may also be used), a resistor R2 and a capacitor C2. A signal from the inverter 3307 of the first delay generating circuit 3301 is supplied to the input terminal of the inverter at the input of this second delay generating circuit 3301, and the output terminal of the inverter 3311 at the output of the second delay generating circuit 3303 is connected to an input terminal of 2-input AND gate 413 and an input terminal of 2-input OR gate 411.

Namely, also with the circuit of FIG. 35, each of the signals RSTon, CLKon and VCCon is generated by directly delaying the Control signal using CR time constants determined by resistors and capacitors.

Figure 36:
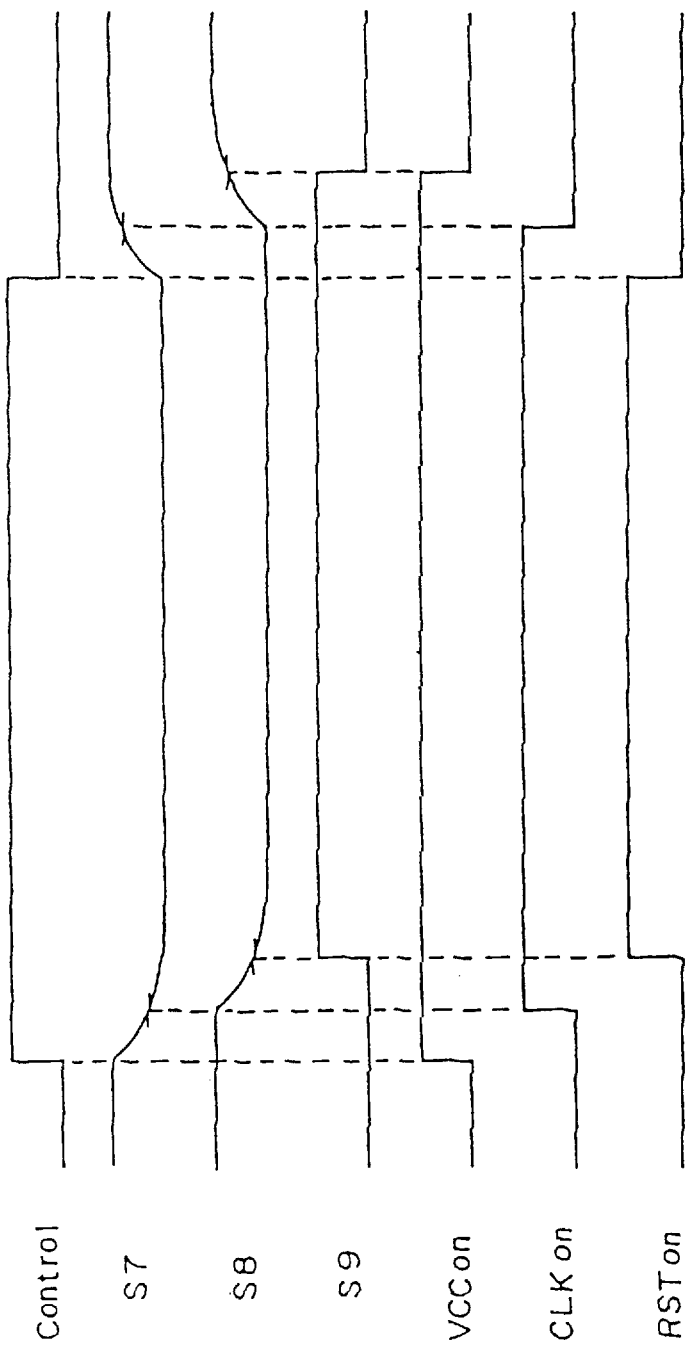
FIG. 36 is a timing chart for describing the operation of the circuit shown in FIG. 35.

Next, the operation of the circuit in FIG. 35 will be described based on the timing chart if FIG. 36. The explanation below is for the circuit of FIG. 35 incorporated into an IC card reader/writer 207.

First of all the operation when the IC card is activated will be described.

The IC card 215 is inserted into the IC card reader/writer 207. Next, a Control signal from a host, such as a personal computer, is set to an 'H' level from an 'L' level. When the Control signal becomes an 'H' level, the VCCon signal becomes an 'H' level. Also, the output from the inverter 3305 of the first delay circuit 3301 (signal S7) gradually changes from an 'H' level to an 'L' level due to the resistor R1 and the capacitor C1.

Next, when signal S7 has settled at the 'L' level, the output of the inverter 3307 of the first delay circuit 3301 (CLKon signal) changes from an 'L' level to an 'H' level. With the trailing edge of the CLKon signal as a trigger, the output of the inverter 3309 of the second delay generating circuit 3303 (signal S8) gradually changes from an 'H' level to an 'L' level due to resistor R2 and capacitor C2.

Subsequently, when signal S8 has settled at the "L" level, the output of the inverter 3311 of the second delay generating circuit 3303 (signal S9) is changed from an 'L' level to an 'H' level. When signal S9 becomes an 'H' level, the RSTon signal becomes an 'H' level and the IC card 215 is activated.

Next, the operation when the card is deactivated will be described. When the IC card 215 is to be deactivated, the control signal from the host, such as a personal computer, becomes an 'L' level. When the Control signal becomes an 'L' level, the RSTon signal becomes an 'L' level. Also, the signal S7 gradually becomes an 'H' level from an 'L' level due to the resistor R1 and the capacitor C2. When signal S7 has settled at the 'H' level, the CLKon signal becomes an 'L' level. With the trailing edge of the CLKon signal as trigger, signal S8 gradually becomes an 'H' level from an 'L' level, due to the resistor R2 and capacitor C2.

Then, when the signal S8 has settled at the 'H' level, signal S9 changes from an 'H' level to an 'L' level. When signal S8 becomes an 'L' level, the VCCon signal becomes an 'L' level and the IC card 215 is deactivated.

According to this embodiment of the present invention, because the second delay generating circuit 3303 is operated with the output of the first delay generating circuit 3301 as a trigger, the order in which the delays are generated is not inverted, even if the values of the resistors and capacitors included in the first and second delay generating means change significantly, and it is possible to construct a circuit which is not influenced by temperature variations or fluctuations in voltage.

In each of the embodiments of the present invention described above, the Control signal, VCCon signal CLKon signal, RSTon signal and CARDin signal have been described as being active when they are at a 'H' level (active high), but it is also possible for them to be active at the 'L' level (active low). This case can be dealt with by using an inverter, using a 2-input NOR gate in place of the 2-input OR gate 411, using a 2-input NAND gate in place of the 2-input AND gate 413, and using the inverted output of the flip-flops. The present invention is not limited to this configuration.

Further, when the IC card control circuit 203 of the present invention is included in an IC card reader/writer 207 and a personal computer is used as the host, sending and reception of data can be carried out between the IC card 215 and the personal computer. In this case, RS-232C is generally used as the interface circuit between the personal computer and the IC card reader/writer 207, and RS signal of the RS-232C is used as the Control signal. Further, if RS-232C is used, since each type of personal computer can be connected thereto, it is possible to provide an excellent general purpose IC card reader/writer.

INDUSTRIAL UTILIZATION

According to the representative examples of the present invention, it is possible to generate various signals for controlling the operating state of an IC card in hardware from a single control signal from a host such as a personal computer.

Accordingly, even when there is only one control signal (one control line) it is possible to comply with an IC card activation/deactivation sequence defined in the ISO standard without building in a CPU. Further, since there is no need to build in a CPU, firmware costs and the need for expensive components such as a CPU and memory are removed, which means that it is possible to curb to manufacturing cost of an IC card reader/writer (IC card control circuit and IC card control circuit).

Further, because a device that complies with the ISO standard is constructed in hardware, it is easy to implement any of the modifications shown in the embodiments or changes in gate logic on the circuit substrate, using spare gate conditions, component layout or wiring pattern conditions.

Also, in the embodiments using counters, because components such as resistors and capacitors are not used, it is possible to integrate the circuit into a single gate array etc.

I claim:

1. An integrated circuit card control circuit comprising:
   clock control circuit for receiving a control signal, delaying the received control signal by a first delay time, and outputting the delayed control signal as a clock control signal;
   a delayed signal generating circuit for receiving the control signal, delaying the control signal by a second delay time which is longer than the first delay time, and outputting the delayed control signal as a delayed signal;
   a power supply control circuit for outputting a power supply control signal in response to one of either the control signal or the delayed signal; and
   a reset control circuit for outputting a reset control signal in response to both the control signal and the delayed signal.

2. The integrated circuit card control circuit of claim 1, wherein the clock control circuit and the delayed signal generating circuit are CR time constant circuits comprising resistors and capacitors.

3. An integrated circuit card control circuit comprising:
   a clock control circuit for receiving a control signal, delaying the received control signal and outputting the delayed control signal as a clock control signal;
   a delayed signal generating circuit for receiving the clock control signal, delaying the clock control signal and outputting the delayed clock control signal as a delayed signal;
   a power supply control circuit for outputting a power supply control signal in response to one of either the control signal or the delayed signal; and
   a reset control circuit for outputting a reset control signal in response to both the control and the delayed signal.

4. The integrated circuit card control circuit of claim 3, wherein the clock control circuit and the delayed signal generating circuit are CR time constant circuits comprising resistors and capacitors.

5. An integrated circuit card control circuit comprising:
   a first delayed signal generating circuit for outputting a first delayed signal of a first time period in response to a change in state of a control signal;
   a clock control signal generating circuit, connected to the first delayed signal generating circuit, for outputting a clock control signal in response to a change in state of the first delayed signal after the first time period;
   a second delayed signal generating circuit for outputting a second delayed signal of a second time period longer than the first time period in response to a change in state of the control signal;
   a first signal generating circuit, connected to the second delayed signal generating circuit, for outputting a first signal in response to a change in state of the second delayed signal after the second time period;
   a power supply control circuit for generating a power supply control signal in response to one of:
     the control signal, or
     the first signal; and
   a reset control circuit for generating a reset control signal in response to both the control signal and the first signal.

6. The integrated circuit card control circuit of claim 5, further comprising a logic circuit receiving as inputs a combination of one of:
   the first signal and the control signal, or
   the clock control signal and the control signal, and
   outputting an operation start signal, indicating a change in state of the control signal, to the first delayed signal generating circuit and the second delayed signal generating circuit.

7. The integrated circuit card control circuit of claim 6, wherein the logic circuit comprises an exclusive OR logic gate.

8. An integrated circuit card control circuit comprising:
   a first delayed signal generating circuit for outputting a first delayed signal of a first time period in response to a change in state of an internal control signal;
   a clock control signal generating circuit, connected to the first delayed signal generating circuit, for outputting a clock control signal in response to a change in state of the first delayed signal after the first time period;
   a second delayed signal generating circuit for outputting a second delayed signal of a second time period longer than the first time period in response to a change in state of the internal control signal;
   a first signal generating circuit, connected to the second delayed signal generating circuit, for outputting a first signal in response to a change in state of the second delayed signal after the second time period;
   a power supply control circuit for generating a power supply control signal in response to one of:
     the internal control signal, or
     the first signal;
   a reset control circuit for generating a reset control signal in response to both the control signal and the first signal; and
   host signal control means, comprising an internal control signal generating circuit receiving the first signal and an external control signal as inputs, and generating the internal control signal from the external control signal, wherein:
     when the first signal is not being input, the internal control signal is changed in response to a change in state of the external control signal, and
     when the first signal is being input, the state of the internal control signal is maintained regardless of the state of the external control signal.

9. The integrated circuit card control circuit of claim 8, further comprising a logic circuit receiving as inputs a combination of one of:
   the internal control signal and the clock control signal, or
   the internal control signal and the first signal, and
   outputting an operation of start signal, indicating a change in state of the internal control signal, to the first delayed signal generating circuit and the second delayed signal generating circuit.

10. The integrated circuit card control circuit of claim 9, wherein the logic circuit comprises an exclusive OR logic gate.

11. An integrated circuit card control circuit comprising:
a first delayed signal generating circuit for outputting a first delayed signal of a first time period in response to a change in state of a control signal;
a clock control signal generating circuit, connected to the first delayed signal generating circuit, for outputting a clock control signal in response to a change in state of the first delayed signal after the first time period;
a second delayed signal generating circuit, connected to the first delayed signal generating circuit, for outputting a second delayed signal of a second time period in response to a change in state of the first delayed signal after the first time period;
a first signal generating circuit, connected to the second delayed signal generating circuit, for outputting a first signal in response to a change in state of the second delayed signal after the second time period;
a power supply control circuit for generating a power supply control signal in response to one of:
the control signal, or
the first signal; and
a reset control circuit for outputting a reset control signal in response to both the control signal and the first signal.

12. An integrated circuit card control circuit comprising:
a first delayed signal generating circuit for outputting a first delayed signal of a first time period in response to a change in state of an internal control signal;
a clock control signal generating circuit, connected to the first delayed signal generating circuit, for outputting a clock control signal in response to a change in state of the first delayed signal after the first time period;
a second delayed signal generating circuit, being connected to the first delayed signal generating circuit, for outputting a second delayed signal of a second time period in response to a change in state of the first delayed signal after the first time period;
a first signal generating circuit, connected to the second delayed signal generating circuit, for outputting a first signal in response to a change in state of the second delayed signal after the second time period;
a power supply control circuit for generating a power supply control signal in response to one of:
the internal control signal, or
the first signal;
a reset control circuit for generating a reset control signal in response to both the control signal and the first signal; and
host signal control means, comprising an internal control signal generating circuit receiving the first signal and an external control signal as inputs, and generating the internal control signal from the external control signal, wherein:
when the first signal is not being input, the internal control signal is changed in response to a change in state of the external control signal, and
when the first signal is being input, the state of the internal control signal is maintained regardless of the state of the external control signal.

13. An integrated circuit card control circuit comprising:
a counter for counting clock pulses in response to a change in state of a control signal, wherein:
a first signal is output when a first number of clock pulses are counted, and
a second signal is output when a second number of clock pulses are counted;
a clock control signal generating circuit for outputting a clock control signal in response to the first signal;
a first signal generating circuit for outputting a third signal in response to the second signal;
a power supply control circuit for outputting a power supply control signal in response to one of:
the control signal, or
the third signal; and
a reset control circuit for outputting a reset control signal in response to both the control signal and the third signal.

14. An integrated circuit card control circuit comprising:
counter for counting clock pulses in response to a change in state of an internal control signal, wherein:
a first signal is output when a first number of clock pulses are counted, and
a second signal is output when a second number of clock pulses are counted;
a clock control signal generating circuit for outputting a clock control signal in response to the first signal;
a first signal generating circuit for outputting a third signal in response to the second signal;
a power supply control circuit for outputting a power supply control signal in response to one of:
the internal control signal, or
the third signal;
a reset control circuit for outputting a reset control signal in response to both the internal control signal and the third signal; and
host signal control means, comprising an internal control signal generating circuit receiving the third signal and an external control signal as inputs, and generating the internal control signal from the external control signal, wherein:
when the third signal is not being input to the host signal control means, the internal control signal is changed in response to a change in state of the external control signal, and
when the third signal is being input to the host signal control means, the state of the internal control signal is maintained regardless of the state of the external control signal.

15. An integrated circuit card control system comprising:
a clock control circuit for outputting a clock control signal of a first time period in response to a control signal;
a delayed signal generating circuit for outputting a delayed signal of a second time period longer than the first time period, in response to the control signal;
a power supply control circuit for outputting a power supply control signal in response to one of:
the control signal, or
the delayed signal;
a reset control circuit for outputting a reset control signal in response to both the control signal and the delayed signal;
a first terminal corresponding to an integrated circuit card power supply terminal;
a second terminal corresponding to a clock terminal of the integrated circuit card;
a third terminal corresponding to a reset terminal of the integrated circuit card;
a fourth terminal corresponding to an output terminal of the integrated circuit card;

a power supply potential supply circuit, connected between the power supply control circuit and the first terminal, for supplying a power supply potential to the first terminal and the fourth terminal in response to the power supply control signal;

an oscillator circuit for generating a clock signal;

a first logic circuit, connected to the oscillator circuit, the clock control circuit and the second terminal, for supplying the clock signal to the second terminal in response to the clock control signal;

a card-in detecting circuit for detecting the insertion of an integrated circuit card and outputting a card-in detection signal; and a second logic circuit, connected to the card-in detecting circuit, the reset control circuit and the third terminal, for supplying a reset signal to the third terminal based on the card-in detection signal and the reset control signal.

16. An integrated circuit card control system comprising:

a clock control circuit for outputting a clock control signal of a first time period in response to a control signal;

a delayed signal generating circuit for outputting a delayed signal of a second time period longer than the first time period, in response to the control signal and a card-in detection signal;

a power supply control circuit for outputting a power supply control signal in response to one of the control signal or the delayed signal;

a reset control circuit for outputting a reset control signal in response to both the control signal and the delayed signal;

a first terminal corresponding to an integrated circuit card power supply terminal and for receiving a power supply potential;

a second terminal corresponding to a clock terminal of the integrated circuit card and for receiving a clock signal;

a third terminal corresponding to a reset terminal of the integrated circuit card and for receiving a reset control signal;

a fourth terminal corresponding to an input/output terminal of the integrated circuit card and for receiving the power supply potential;

a power supply potential supply circuit, connected between the power supply control circuit and the first terminal, for supplying the power supply potential to the first terminal and the fourth terminal in response to the power supply control signal;

an oscillator circuit for generating the clock signal;

a logic circuit connected to the oscillator circuit, the clock control circuit and the second terminal, for supplying the clock signal to the second terminal in response to the clock control signal; and a card-in detecting circuit for detecting the insertion of an integrated circuit card and outputting the card-in detection signal which enables the reset control circuit to output the reset control signal.

* * * * *